United States Patent
Hoshino et al.

(10) Patent No.: US 7,137,075 B2
(45) Date of Patent: Nov. 14, 2006

(54) METHOD OF DISPLAYING, A METHOD OF PROCESSING, AN APPARATUS FOR PROCESSING, AND A SYSTEM FOR PROCESSING MULTIMEDIA INFORMATION

(75) Inventors: Takeshi Hoshino, Kodaira (JP); Satoko Kojima, Kokubunji (JP); Atsushi Ishibashi, Kokubunji (JP); Gen Nagai, Ome (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/949,364

(22) Filed: Sep. 27, 2004

(65) Prior Publication Data

US 2005/0060666 A1   Mar. 17, 2005

Related U.S. Application Data

(63) Continuation of application No. 09/463,010, filed as application No. PCT/JP99/04266 on Aug. 6, 1999, now abandoned.

(30) Foreign Application Priority Data

Aug. 24, 1998   (JP)   ................................. 10-237636

(51) Int. Cl.
*G06F 3/00* (2006.01)
(52) U.S. Cl. ...................... 715/848; 715/811; 715/815; 715/836; 715/850
(58) Field of Classification Search ................ 715/764, 715/810, 811, 815, 835, 836, 838, 839, 846, 715/848, 849, 850, 852–854, 866; 701/36, 701/49
See application file for complete search history.

(56) References Cited

U.S. PATENT DOCUMENTS

| | | | | |
|---|---|---|---|---|
| 5,552,806 | A | | 9/1996 | Lenchik |
| 5,774,878 | A | * | 6/1998 | Marshall .................... 705/36 R |
| 5,798,760 | A | * | 8/1998 | Vayda et al. ................. 715/834 |
| 5,835,087 | A | * | 11/1998 | Herz et al. ................... 715/810 |
| 5,835,094 | A | | 11/1998 | Ermel et al. |
| 5,838,326 | A | | 11/1998 | Card et al. |
| 5,852,440 | A | | 12/1998 | Grossman et al. |
| 5,880,733 | A | * | 3/1999 | Horvitz et al. ............... 715/850 |
| 6,005,578 | A | * | 12/1999 | Cole ........................... 715/854 |
| 6,005,601 | A | * | 12/1999 | Ohkura et al. ................. 725/52 |
| 6,088,032 | A | | 7/2000 | Mackinlay |
| 6,201,540 | B1 | | 3/2001 | Gallup et al. |
| 6,236,398 | B1 | | 5/2001 | Kojima et al. |
| 6,243,091 | B1 | * | 6/2001 | Berstis ....................... 715/839 |
| 6,253,218 | B1 | | 6/2001 | Aoki et al. |
| 6,295,062 | B1 | | 9/2001 | Tada et al. |
| 6,414,677 | B1 | * | 7/2002 | Robertson et al. .......... 345/419 |

(Continued)

FOREIGN PATENT DOCUMENTS

JP    2-235095 A    9/1990

(Continued)

*Primary Examiner*—Lucila X. Bautista
(74) *Attorney, Agent, or Firm*—Mattingly, Stanger, Malur & Brundidge, P.C.

(57) ABSTRACT

A screen in which icons of a plurality of information items are arranged is displayed as a information selecting screen to display information selected from the screen by the user.

In the operation, icons of information items of different kinds are horizontally displayed, and a degree of details of the information is changed in the vertical direction and a degree of recommendation of the information to the user is changed in a direction of depth.

The user can easily select desired information from a large amount of various contents supplied and the information can be optimally displayed for the user.

3 Claims, 19 Drawing Sheets

U.S. PATENT DOCUMENTS

| | | |
|---|---|---|
| 6,426,761 B1 | 7/2002 | Kanevsky et al. |
| 6,466,237 B1 | 10/2002 | Miyao et al. |
| 6,480,210 B1 * | 11/2002 | Martino et al. ............. 715/848 |
| 6,492,997 B1 | 12/2002 | Gerba et al. |
| 6,621,509 B1 * | 9/2003 | Eiref et al. ................. 715/836 |
| 2003/0146940 A1 * | 8/2003 | Ellis et al. .................. 345/811 |

FOREIGN PATENT DOCUMENTS

| | | |
|---|---|---|
| JP | 10-91388 A | 4/1998 |
| JP | 10-187743 A | 7/1998 |

* cited by examiner

* QUESTIONNAIRE IS NOT DISPLAYED FOR SHORT TIME OF VIEWING

FIG. 20

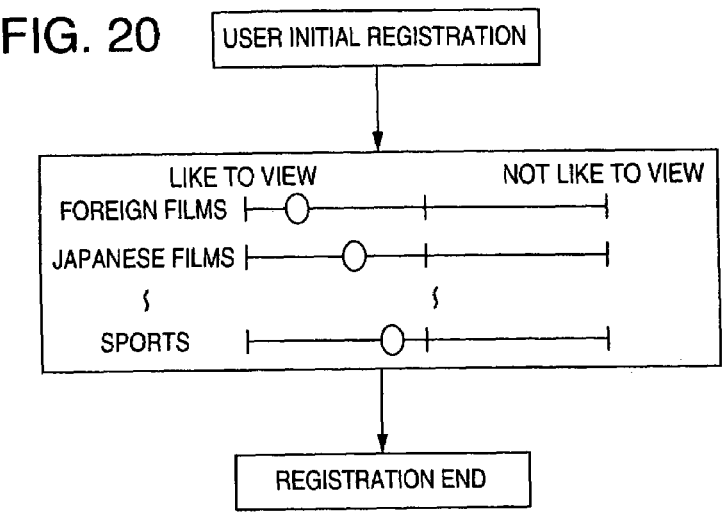

FIG. 21

PROFILE DATA

USER GENRE PROFILE TABLE

|  | 0:00~3:00 | 6:00~9:00 | 21:00~24:00 |
|---|---|---|---|
| POINT NO. 1 | FOREIGN FILMS: 48 POINTS | NEWS: 54 POINTS | FOREIGN FILMS: 72 POINTS |
| POINT NO. 2 | JAPANESE FILMS: 45 POINTS | WEATHER FORECAST: 48 POINTS | DRAMAS: 66 POINTS |
| ⁞ | ⁞ | ⁞ | ⁞ |
| POINT NO. 30 | SPORTS: 14 POINTS | DRAMAS: 17 POINTS | COOKING: 29 POINTS |

USER KEYWORD PROFILE TABLE

|  | JAPANESE FILMS | SPORTS | NEWS |
|---|---|---|---|
| POINT NO. 1 | MIHO NAKAYAMA: 46 POINTS | GIANTS: 58 POINTS | WEATHER FORECAST: 73 POINTS |
| POINT NO. 2 | THRILLERS: 44 POINTS | NIGHT GAMES: 42 POINTS | TODAY: 65 POINTS |
| ⁞ | ⁞ | ⁞ | ⁞ |
| POINT NO. 50 | PARODIES: 16 POINTS | HIDEKI MATSUI: 14 POINTS | KANTO DISTRICT: 25 POINTS |

ITEMS LEARNED BY EACH USER, ITEMS DELIVERED FROM SERVICE PROVIDERS, ETC.

METHOD OF DISPLAYING, A METHOD OF PROCESSING, AN APPARATUS FOR PROCESSING, AND A SYSTEM FOR PROCESSING MULTIMEDIA INFORMATION

This application is a continuation of U.S. patent application Ser. No. 09/463,010, filed Jan. 19, 2000, now abandoned which is a U.S. National Stage of PCT/JP99/04266, filed Aug. 6, 1999, both of which are incorporated by reference herein in their entirety.

BACKGROUND OF THE INVENTION

1. Field of the Invention

The present invention relates to a method of displaying, a method of processing, an apparatus for processing, and a system for processing multimedia information with high usability in which a user can easily search a large amount of various multimedia information for desired information to select the information.

2. Description of the Related Art

Recently, in the field of television broadcast technology, the communication satellite broadcast has been developed, and it is about to start the digitization of the broadcasting satellite broadcast and the ground wave broadcast.

Namely, a large volume of various contents and various information items are going to be transmitted via broadcast media or through communications to families.

In the following description, contents and various information are collectively referred to as contents, which also applies to the claim.

Additionally, in the field of technology of personal computers (to be referred to as PC herebelow), the network configuration has been developed, and it is possible to retrieve information of the world via, for example, world wide web (WWW) using the Internet.

Although the televisions (TV) and the personal computers have been used by different users for different purposes, it is expected that the televisions or personal computers function as windows of information in the future. In this situation, the televisions and personal computers are assumed to come together into a combined form.

There has been proposed a technology of the prior art to handle a large amount of various contents, namely, a service of television broadcasting in which there is disposed a storage for several hours of video. Information changed at a broadcast of the news, weather forecast, or the like is automatically updated to the latest information so that the user can view the information at any time.

Additionally, as interfaces to select a large volume of various contents, there has been proposed, for example, a technology using characters called icons as contents information which is used to display a program list, to display a menu as a table of contents, and to display details of contents to present contents stored.

Characters such as icons are referred to as contents information herebelow, which also applies to the claim.

The televisions are combined with the personal computers as described above and hence a large amount of various contents are transmitted to the user. However, it is expectedly quite difficult for the user to select desired information from such a large volume of various contents.

The technology of the prior art regarding the interfaces above provides the display of a program list, a menu as a list of contents, and contents by contents information (icons). When the amount of contents increases, the menu or the like is required to be hierarchically configured to display all contents information. This leads to a problem that it is quite difficult for the user to select desired information from the contents information.

Furthermore, a car information system such as a car navigation system or an intelligent transport system is being installed for cars, and various information such as road guide information, traffic information, and information of amusement facilities is introduced to the car information systems. These system is also attended with a problem similar to the problem above.

SUMMARY OF THE INVENTION

It is therefore an object of the present invention to provide a method of displaying, a method of processing, an apparatus for processing, and a system for processing multimedia information with high usability in which a user can easily select desired information from a large amount of various contents or which selects, records, and stores, in place of the user, information associated with taste of the user or which displays selectively recorded and stored contents in an optimal fashion for the user.

To achieve the object in accordance with the present invention, there is provided a multimedia information display method of displaying information of a plurality of multimedia including the steps of displaying a screen in which a plurality of contents information represented by icons are arranged in a three-dimensional fashion and displaying details of contents selected from the screen by the user.

Moreover, the method includes the steps of displaying contents information of different kinds of contents in a horizontal direction and displaying the contents information by sequentially minimizing sizes thereof in a depth direction in consideration of, for example, a variable of the number of uses of contents or a variable of use frequency representing a degree of recommendation of contents.

In addition, the method includes the step of displaying contents information with different contours corresponding to respective media types.

Furthermore, there is provided a multimedia information display method of displaying information of a plurality of multimedia including the steps of assigning, in accordance with a record of uses in the past of information of the plural media by the user, use record information such as the number of uses of the information to the information and displaying information of the plural media according to the use record information. Alternatively, the method includes the steps of generating a plurality of kinds of profiles according to a use record in the past of the user for information of the plural media and displaying information according to at least one of the generated profiles, thereby achieving the object.

Additionally, the method includes the step of generating the profile by adding information associated with use time to information used by the user or generating the profile in association with a genre or a keyword of the information, thereby achieving the object.

Furthermore, to achieve the object, there is provided a multimedia information processing apparatus for processing information of a plurality of multimedia including means for receiving information of a plurality of media, means for generating a profile according to use history of a user, means for displaying the information according to the contents of the profile, and means for recording the information if necessary. Alternatively, the apparatus further includes means for communicating information with a network.

In addition, to achieve the object, there is provided a multimedia information processing system for processing information of a plurality of multimedia including means for receiving information of a plurality of media, a first information processing apparatus including means for displaying the information and means for recording the information if necessary, and a second information processing apparatus for communicating information via a network. A profile is generated according to audiovisual use history of the user in the first and second information processing apparatuses, and information is displayed in the first or second information processing apparatus according to the contents of the profile.

Furthermore, the object can be achieved as follows. Contents information corresponding to a plurality of contents is arranged in a virtual three-dimensional space on a screen and sizes of the contents information are sequentially minimized in a direction of the depth of the screen.

Additionally, the object can be achieved as follows. Contents information items corresponding to a plurality of contents are arranged in a virtual three-dimensional space on a screen, sizes of the contents information are sequentially minimized in a direction of the depth of the screen, and contents information items more frequently used by the user are displayed on the front side near the user.

Moreover, the object can be achieved as follows. A plurality of contents display zones extending in a direction of depth are arranged in a virtual three-dimensional space on a screen, contents information is arranged in the plural contents display zones in association with a plurality of contents selected, and the content information is displayed by sequentially minimizing sizes thereof in a direction of the depth of the screen of each contents display zone.

In addition, the object can be achieved as follows. A plurality of contents display zones extending in a direction of depth are arranged in a virtual three-dimensional space on a screen, contents information is respectively arranged in the plural contents display zones in association with a plurality of contents selected, the content information is displayed by sequentially minimizing sizes thereof in a direction of the depth of the screen of each contents display zone, and a contents display zone associated with the contents information selected is displayed at approximately a center of the screen in a longitudinal direction thereof.

Furthermore, the object can be achieved as follows. A virtual three-dimensional space is set on a screen by arranging a direction of depth in which an upper side of the screen seems to be far away from the user, and the content information corresponding to a plurality of contents is displayed by sequentially minimizing sizes thereof as a position thereof becomes higher in the screen.

Moreover, the object can be achieved as follows. A virtual three-dimensional space is formed on a screen of a display installed in a car, contents information corresponding to a plurality of contents transmitted in one-way communication is arranged therein, and the contents information is displayed by minimizing sizes thereof in a direction of the depth of the screen.

Additionally, the object can be achieved as follows. A virtual three-dimensional space is formed on a screen of a display installed in a car, contents information corresponding to a plurality of contents transmitted in one-way communication is arranged therein, the contents information is displayed by minimizing sizes thereof in a direction of the depth of the screen, and contents information more frequently used by the user is displayed on the front side near the user.

Moreover, the object can be achieved as follows. A virtual three-dimensional space is formed on a screen of a display installed in a car, at least two contents display zones extending in a direction of depth are arranged in the three-dimensional space, contents information corresponding to a plurality of contents transmitted in one-way communication is arranged in one of the contents display zones, contents information corresponding to a plurality of contents transmitted in two-way communication is arranged in another one of the contents display zones, the contents information is displayed by minimizing sizes thereof in a direction of the depth of each of the contents display zones.

In addition, the object can be achieved as follows. A virtual three-dimensional space is formed on a screen of a display installed in a car, a plurality of contents display zones extending in a direction of depth are arranged in the three-dimensional space, contents information is respectively arranged in the plural contents display zones in association with a plurality of contents selected, the content information is displayed by sequentially minimizing sizes thereof in a direction of the depth of the screen of each contents display zone, and a contents display zone associated with the contents information selected is displayed at approximately a center of the screen in a longitudinal direction thereof.

BRIEF DESCRIPTION OF THE DRAWINGS

The objects and features of the present invention will become more apparent from the consideration of the following detailed description taken in conjunction with the accompanying drawings in which:

FIG. 20 is a diagram for explaining a method of setting taste of a user to profile data in an initial state;

FIG. 21 is a diagram for explaining a specific example of profile data created according to the flow shown in FIG. 10;

FIG. 23 is a flowchart for explaining operation to access a profile when a processing apparatus 700 of FIG. 3 is a personal computer installed in an office or the like;

DESCRIPTION OF THE PREFERRED EMBODIMENTS

Figure 1:
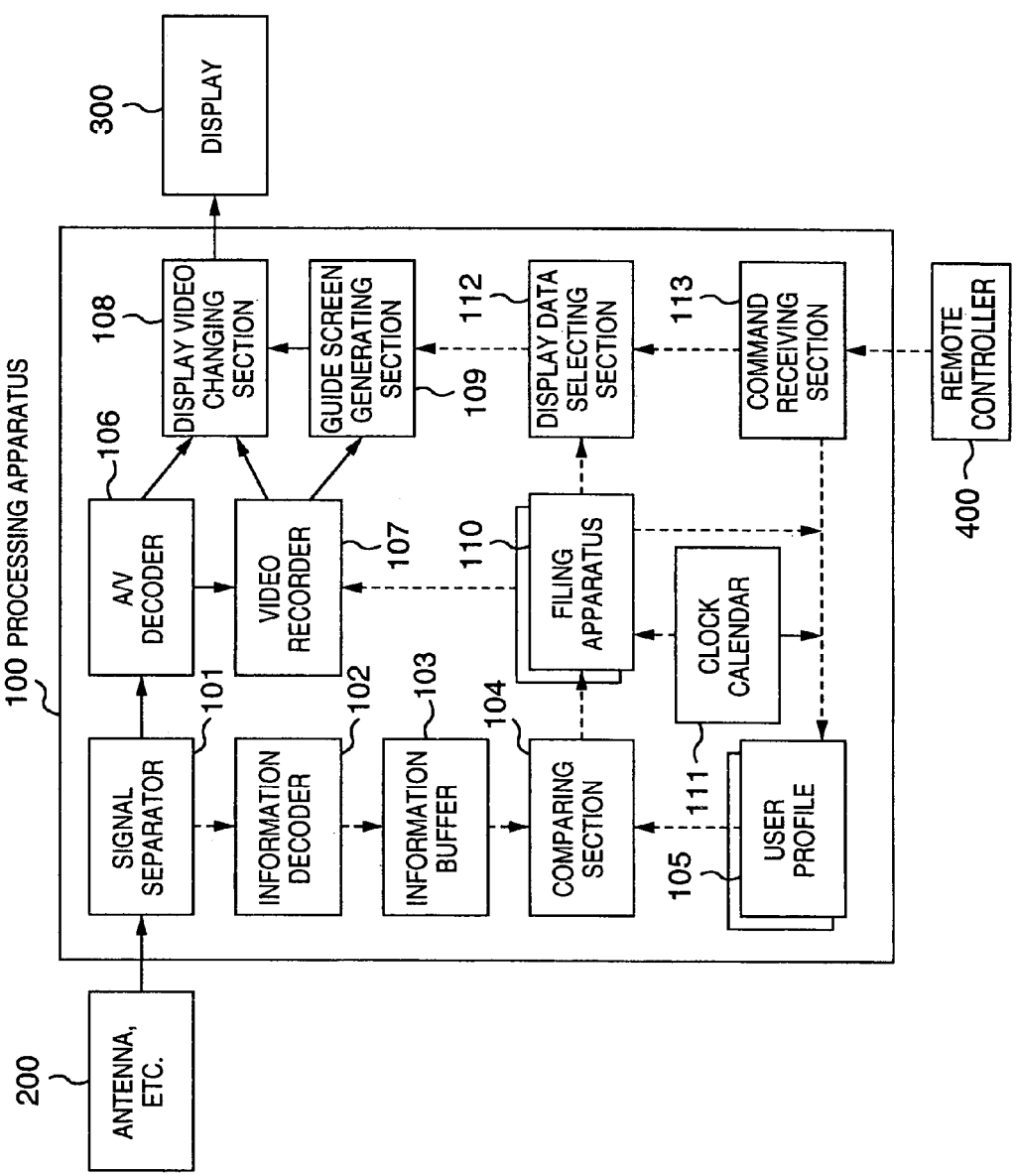
FIG. 1 is a block diagram showing an example of constitution of an embodiment of a multimedia information processing apparatus in accordance with the present invention.

Referring now to the drawings, description will be given in detail of embodiments of a method of displaying, a method of processing, an apparatus for processing, and a system for processing multimedia information in accordance with the present invention.

FIG. 1 shows an embodiment of a multimedia information processing apparatus 100 in accordance with the present invention in which media as information includes only media of a one-way communication such as a TV broadcast. Apparatus 100 receives a broadcast signal from an antenna 200 and displays, on a display, video and audio information selected by a user using a remote controller under control of the user.

Processing apparatus 100 includes a signal separator 101, an information decoder 102, an information buffer 103, a comparing section 104, a user profile 105, an A/V decoder 106, a video recorder 107, a display video changing section 108, a guide screen generator 109, a filing apparatus 110, a clock calendar 111, a display data selector 112, and a command receiver 113.

In the configuration above, signal separator 101 has a function to demodulate a broadcast signal received, namely, separates information including video and audio transmitted from relational information associated with the video and audio information and transmits these information items to A/V decoder 106 and information decoder 102, respectively.

Relational information supplied to decode 102 includes, for example, program information for a TV broadcast, i.e., text data of a title, time (start time to end time), a genre and a sub-genre, performers, players, director, etc., an introductory statement, and a media and a station name. Data resultantly decoded is stored in information buffer 103.

In this connection, although a large number of programs are concurrently broadcast in TV broadcasts, signal separator 101 and information decoder 102 can separate and decode relational information of all programs, namely, information thereof is stored in information buffer 103.

When apparatus 100 is used in a family, there may be disposed a plurality of user profiles 105 according to constitution of the family or according to respective purposes of an individual person.

User profiles 105 include history of use of broadcast media used by each person in the past, i.e., history of audiovisual use in this situation.

The history includes points of a genre and sub-genres, points of each keyword (a title, performers, an introductory statement, etc.), and points of each time zone of the point data.

Incidentally, the points above are calculated according to an audience or viewing frequency, an audience time, etc. of each genre or the like when broadcast media is audiovisually received and represent a degree of utilization for each genre. The points are not limited to those above and may be any variables which represent a degree of utilization.

Comparator 104 compares data stored in information buffer 103 with data stored in user profile 105 to detect a degree of matching. Specifically, comparator 104 searches program information of programs currently being broadcast to detect program information having a high point in the data of user profile 105 and transfers the data to filing apparatus 110.

Filing apparatus 110 records therein data for each person and controls video recorder 107 according to the data.

On the other hand, A/V decoder 106 having received information of video and audio from signal separator 101 decodes information of video and audio of a program being broadcast and transfers the information to video recorder 107 and display video changing section 108.

Video recorder 107 records therein information of video and audio of a program specified by filing apparatus 110 according to data from apparatus 110.

When it is desired to audiovisually receive a TV program or information recorded on video recorder 107 by operating apparatus 100, the user operates remote controller 400 to sequentially send operation commands to apparatus 100.

Command receiver 113 of apparatus 100 receives a command from remote controller 400 and passes the command to display data selector 112.

Selector 112 transfers the command to guide screen generator 109 according to the command received. Alternatively, when the command includes personal identification data, selector 112 selects filing apparatus 1110 corresponding to the data and then transfers the data and the command to guide screen generator 109.

Generator 109 creates a guide screen according to the command received, data in the filing apparatus, and information of video and the like stored in video recorded 107.

Display video changing section 108 selects video from A/V decoder 106, video recorder 107, and guide screen 109 to display video selected on display 300. In this connection, operation of the user, the guide screen, and video selection will be described in detailed later.

Figure 2:
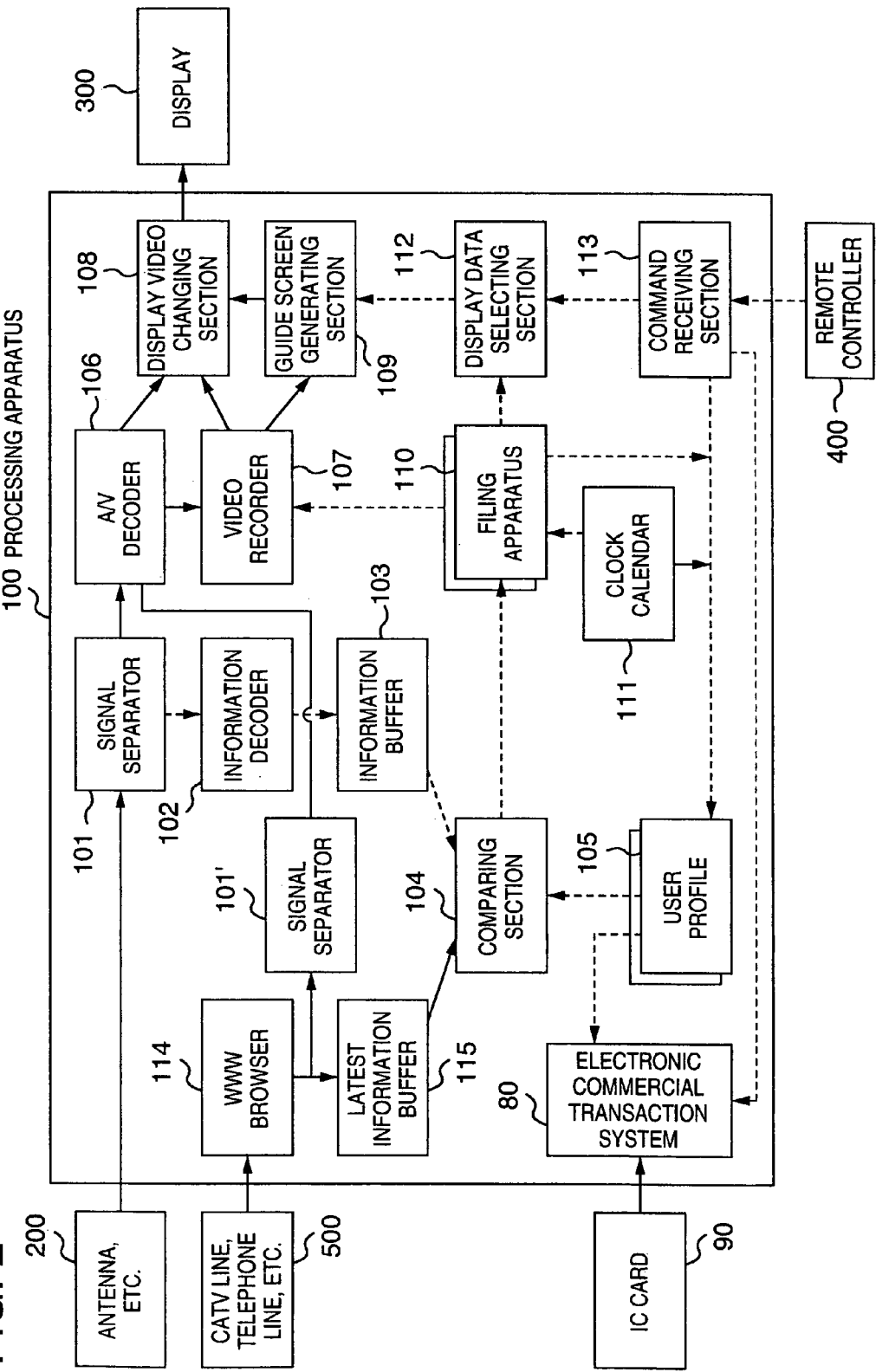
FIG. 2 is a block diagram showing another example of constitution of an embodiment of a multimedia information processing apparatus in accordance with the present invention.

FIG. 2 shows a multimedia information processing apparatus 100 for one-way communication media of a TV broadcast and two-way communication media obtained via the Internet through a communication line such as a CATV line or a telephone line (including a communication apparatus including a portable telephone function).

Apparatus 100 shown in FIG. 2 includes a WWW browser 114 to receive information from communication line 500, a signal separator 101' to separate video information and audio signals, and a latest information buffer 115 in addition to processor 100 shown in FIG. 1.

In the configuration above, data regarding information from browser 114 includes a title, a genre and sub-genres in a directory, an introductory statement, a keyword, etc. For example, latest information buffer 115 keeps therein about two last months of home pages accessed by the user in the past. The data is used in almost the same manner as for the data stored in information buffer 103 described in conjunction with FIG. 1.

Additionally, video information and the like in the information from browser 114 is separated by signal separator 101' to be fed to A/V decoder 106.

A signal from separator 101' is used in almost the same way as the signal from separator 101 described using FIG. 1.

Figure 3:
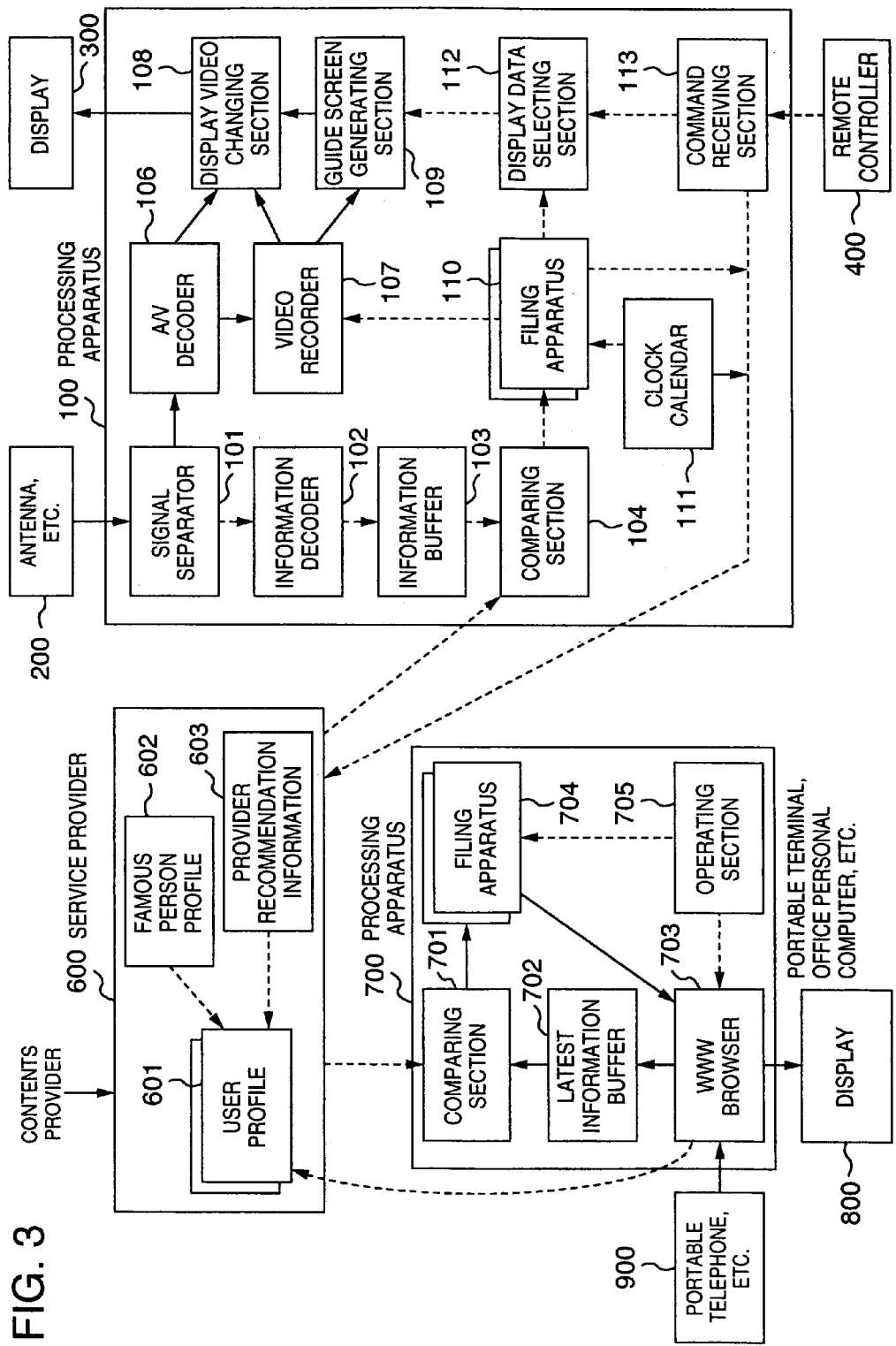
FIG. 3 is a block diagram showing an example of constitution of an embodiment of a multimedia information processing system in accordance with the present invention.

FIG. 3 shows a multimedia information processing system in which user files are generated and saved by a service provider and information obtained via a communication line is processed by a portable terminal, a personal computer, or the like.

The system of FIG. 3 includes a processing apparatus 100, a service provider 600, and a processing apparatus 700 such as a portable terminal or a personal computer.

Apparatus 100 is configured by removing user profiles 105 from apparatus 100 described in conjunction with FIG. 1 and is connected via a communication line to service provider 600.

Provider 600 generates and keeps therein user profiles 601 for respective persons of the user according to command information from apparatus 110 and data in filing apparatus 100. When the user desires to view and/or to listen video information or the like using apparatus 100, provider 600 transmits data to comparator 103 of the apparatus 100.

Information in profiles 601 is used in almost the same fashion as the contents of profiles 105 described in conjunction with FIG. 1.

Service provider 600 generates a famous person profile 602 and provider recommendation information 603 and provides as reference for the user to view and/or to listen video information and the like using processing apparatus 100.

Processing apparatus 700 includes a comparing section 701, a latest information buffer 702, a WWW browser 704 connected to portable telephones or the like, a filing apparatus 704, and an operating section 705. Apparatus 700 executes processing for media information via communication lines as described by referring to FIG. 2.

The user can audiovisually utilize or view information via the Internet or the like using a display 800 connected to apparatus 700.

In this situation, the user acquires desired information by operating WWW browser 703 from operating section 705.

In this operation, data in buffer 702 storing information in the past and data in profile 601 of provider 600 are referred to by comparator 701.

Apparatus 700 connects thereto a portable telephone 900 to obtain information via the Internet or the like and communicates data with service provider 600 to thereby generate user profile 601 in provider 600.

Additionally, when processing apparatus includes a personal computer or the like, a telephone line may be connected thereto in place of the portable telephone 900.

Figure 4:
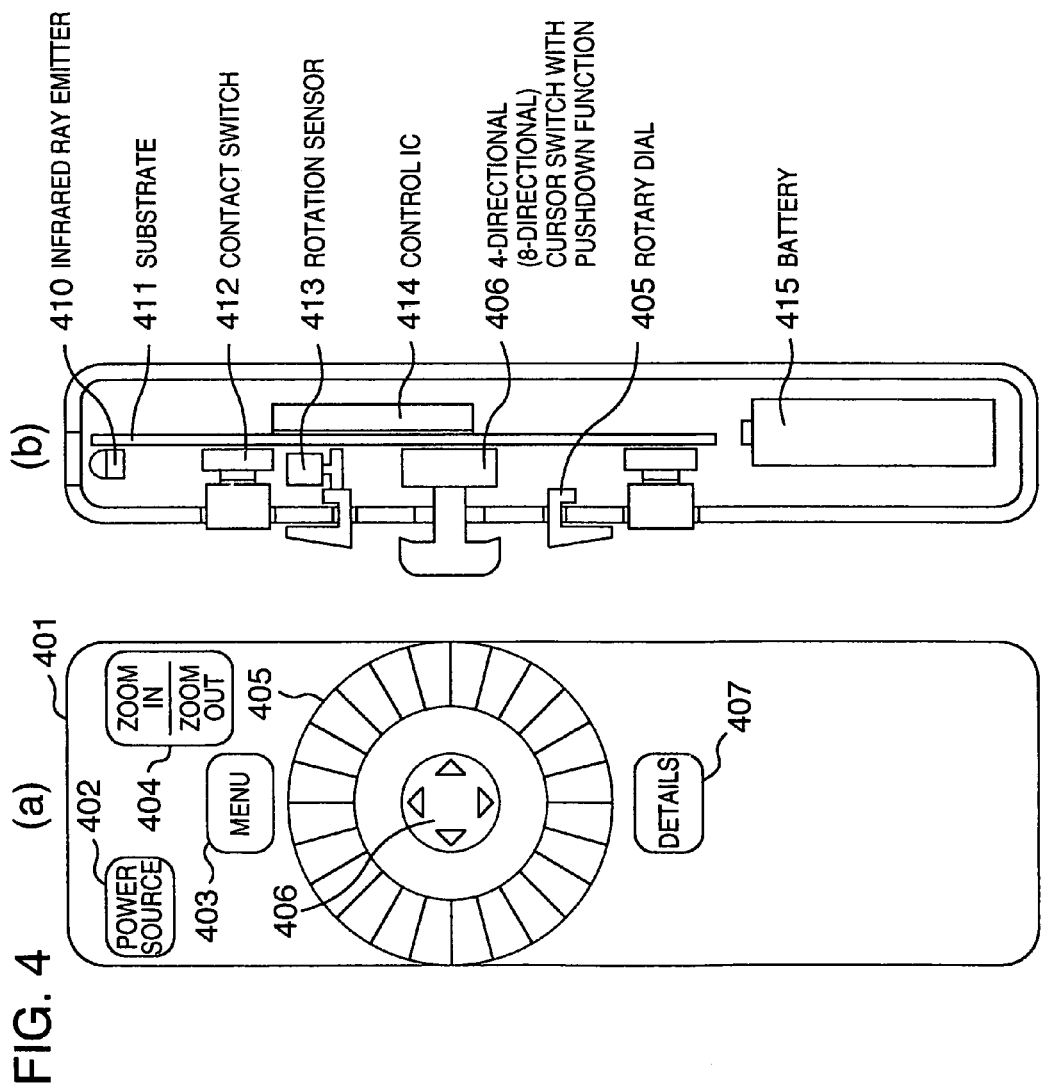
FIG. 4 is a diagram showing an example of constitution of a remote controller.

Referring next to FIG. 4, description will be given of a configuration of remote controller to operate the embodiment of processing apparatus 100 of the present invention described above.

In apparatus 100, there may be naturally disposed an operating mechanism capable of achieving operation equivalent to the operation which can be conducted by remote controller 400.

Remote controller 400 includes a main section 401, a power source switch 402, a menu switch 403, a zoom-in/zoom-out switch 404, a rotary dial 405, a cursor switch 406, and a detail switch 407 which are arranged on an upper surface of section 401 as shown in a top view of FIG. 4(a); a line substrate 411 internally disposed as shown in a cross-sectional view of FIG. 4(b); a connection. IC 414, and infrared ray emitter 410 which are disposed on substrate 411; a rotary sensor 413 for rotary dial 405, and contact switch 412 configuring switches.

In this connection, functions, using methods, and the like of the respective switches and rotary dial 405 of remote controller 400 above will be described later.

Operation of processing apparatus 100 shown in FIGS. 1 to 3 can be conducted by a remote controller constructed as shown in FIG. 4(a) and FIG. 4(2). However, when there exists a request to directly reproduce video from video recorder 107, a group of switches 409 may be arranged in remote controller 400 to directly control video recorder as shown in FIG. 4(c).

Next, description will be given of an example and a basic concept of a guide screen for the user to select desired contents from a large amount of various contents.

Figure 5:
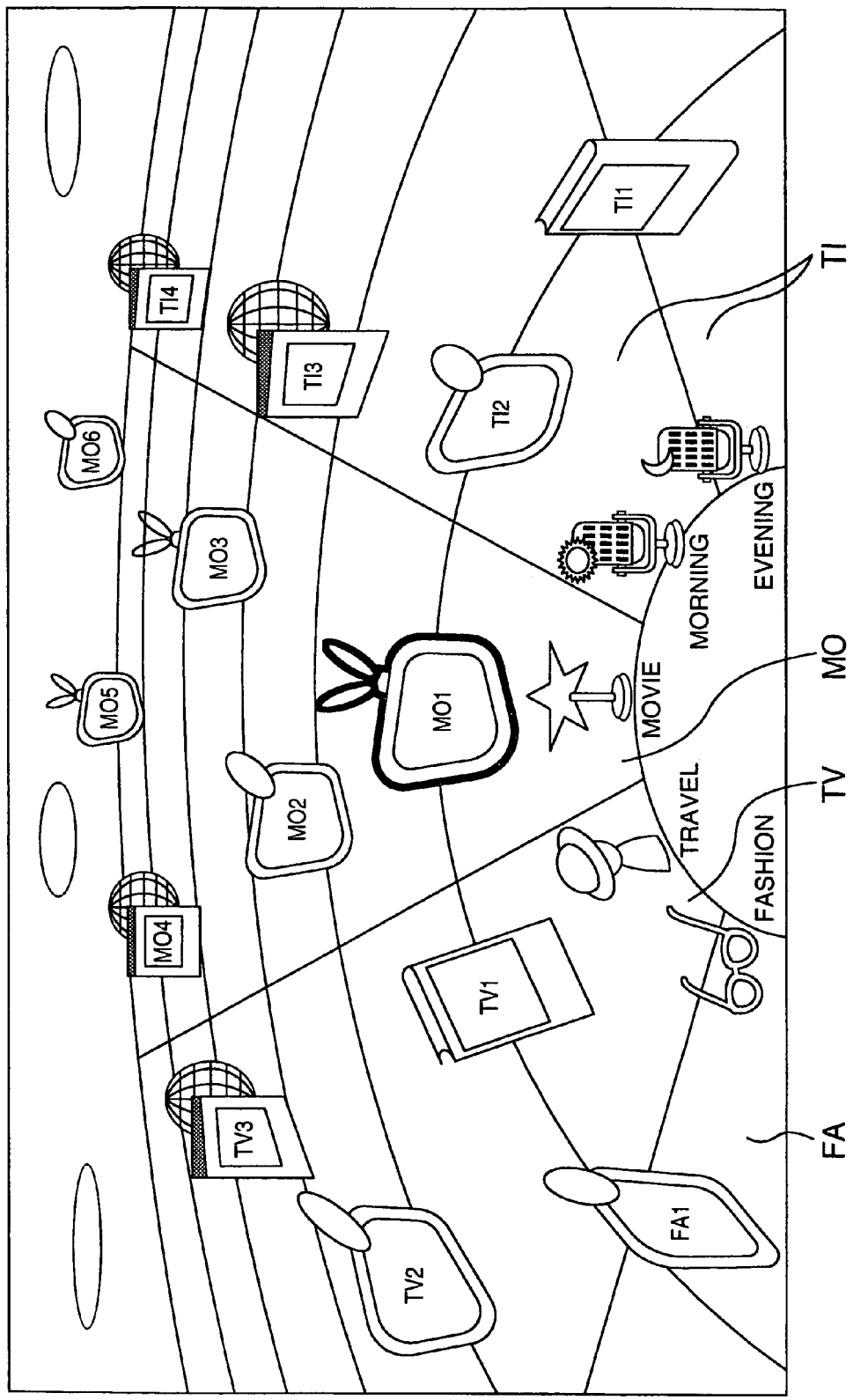
FIG. 5 is a diagram for explaining an example of a guide screen to select information in accordance with the present invention.
Figure 6:
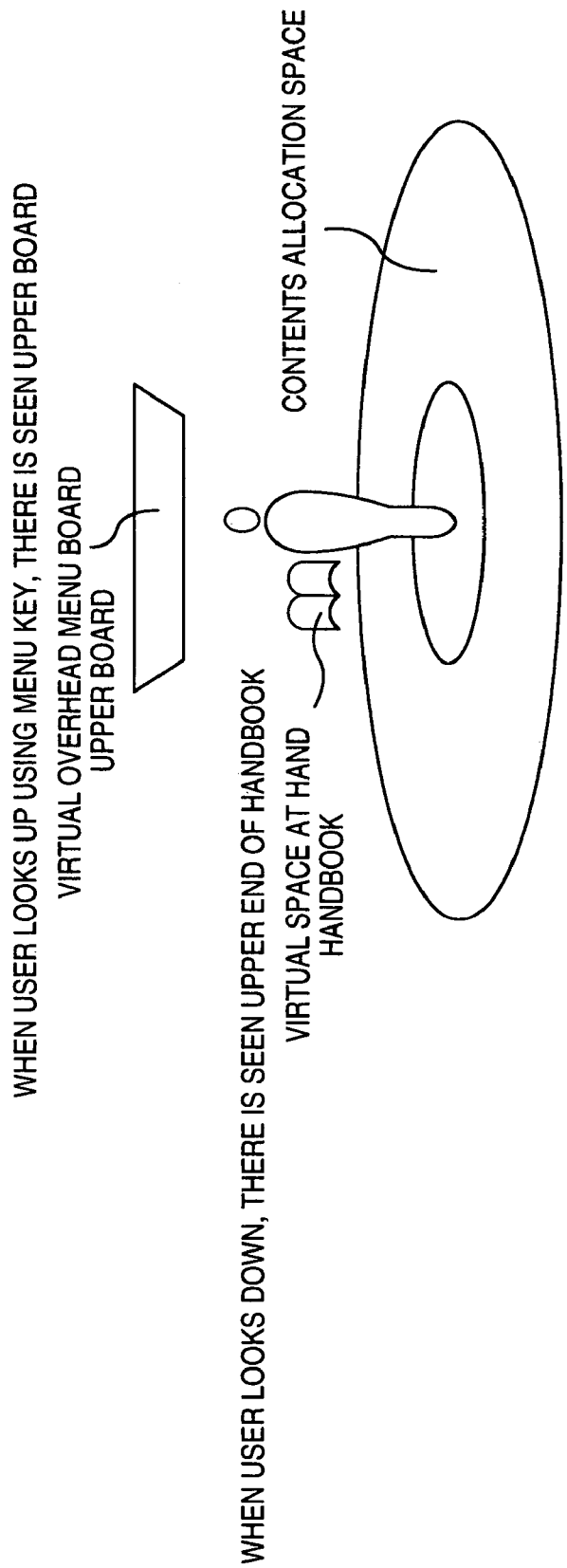
FIG. 6 is a diagram for explaining a basic idea of the guide screen.
Figure 7:
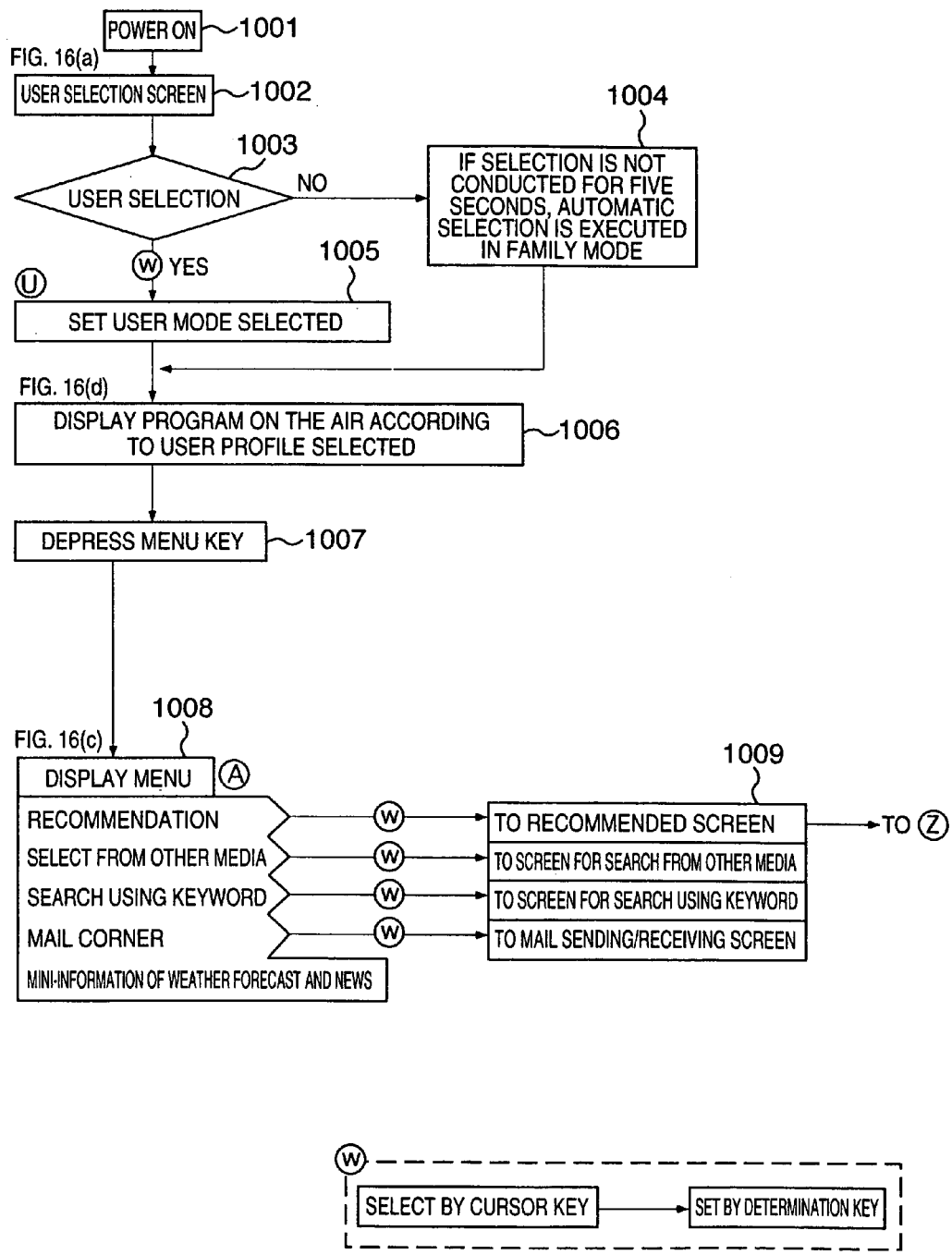
FIG. 7 is a flowchart for explaining operation to select information for the viewing thereof and operation of the processing apparatus in the embodiment in accordance with the present invention.
Figure 8:
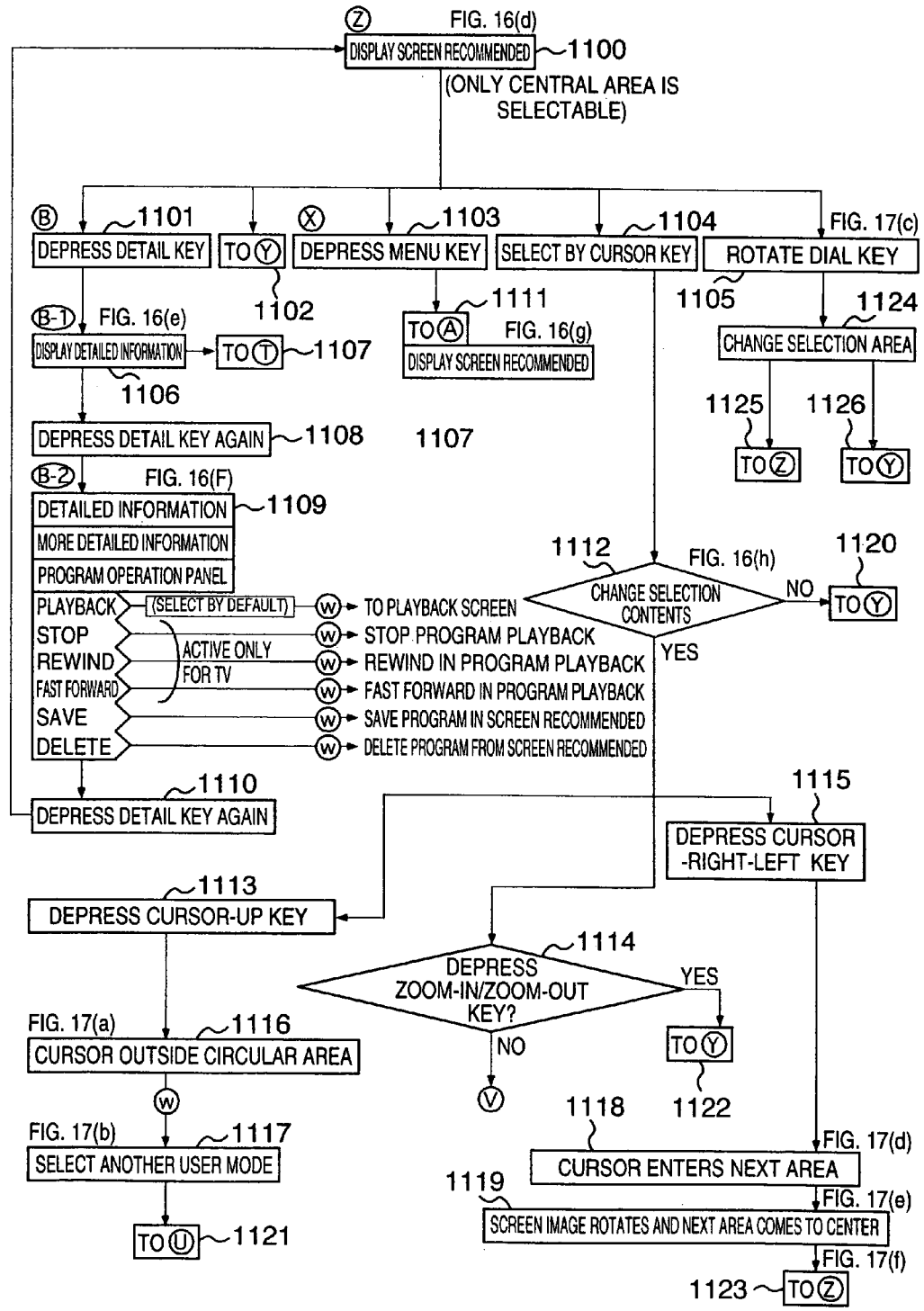
FIG. 8 is a flowchart for explaining operation to select information for the viewing thereof and operation of the processing apparatus in the embodiment in accordance with the present invention.
Figure 9:
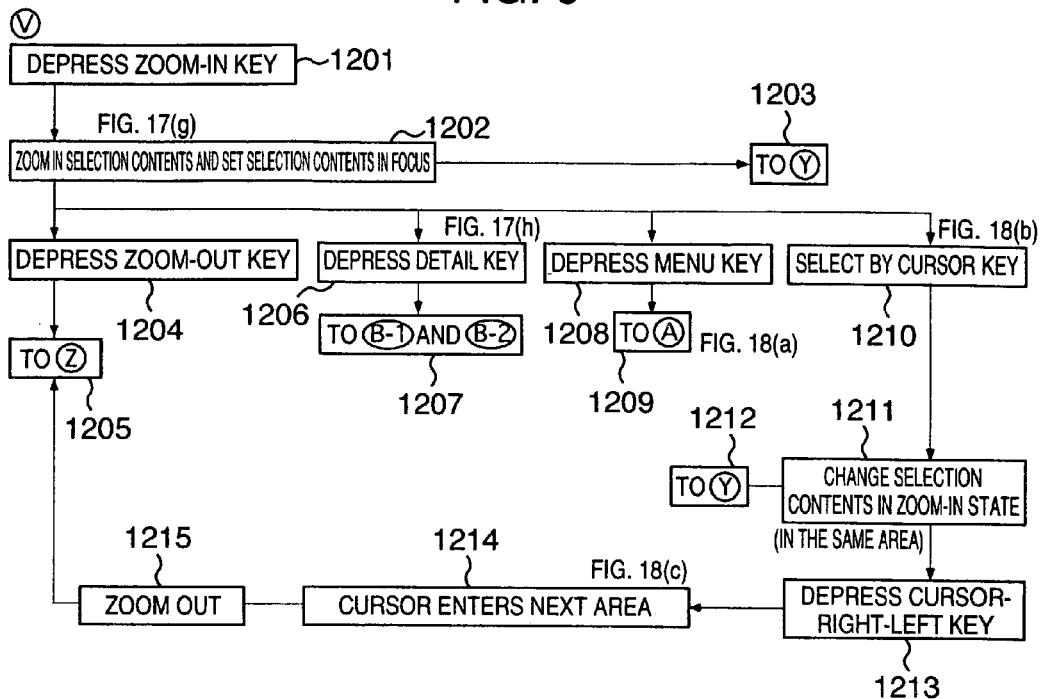
FIG. 9 is a flowchart for explaining operation to select information for the viewing thereof and operation of the processing apparatus in the embodiment in accordance with the present invention.

FIG. 5 is a diagram to explain a guide (interface) screen example to select information in accordance with the present invention and FIG. 6 is a diagram to explain a basic idea thereof.

In general, interfaces are evaluated according to recognizability (visibility and understandability) and operability (usability) thereof.

The present invention sets "recognition model" to improve recognizability of an interface screen, the recognition model being created by using as a model a virtual three-dimensional space which is similar to a field of the daily life.

Thanks to the model, even when the user looks at the interface screen associated with the recognition model of the present invention, the user can conduct operations naturally according to intuition matching with the daily behavior pattern. Even when the user first operates the interface screen, the screen is quite easy to use and its operation is easy to learn.

That is, the basic idea of the present invention is that contents information for which contents such as icons are defined is arranged to surround a user herself or himself standing on a plane as shown in FIG. 6. To watch the contents information in detail, the user turns her or his eyes upon a notebook at hand to check entries on the notebook.

Moreover, to change control to another selection method (for example, a keyword retrieval), the user looks at a menu plate placed at an upper position in front of the user.

Using the display above, the user can operate the screen in a manner similar to his or her daily behavior pattern.

Various contents information items are selected according to genres and categories to be arranged in a horizontal direction, namely, around the position where the user stands.

In this regard, items which have a higher degree of use, namely, a higher degree of recommendation, a higher degree of interest of the user, or a higher frequency of use are arranged in a front side. When the degree of use becomes smaller, the associated items are arranged in a direction of depth in a sequence in which sizes thereof are sequentially minimized. Incidentally, a higher degree of recommendation, a higher degree of interest of the user, and a higher frequency of use are collectively expressed as "utilization degree" in the following description. This also applies to the claims.

Thanks to the display above, the user can view the contents information surrounding the user by changing his or her field of vision and can view an overall image of contents information recommended.

Then, since the contents information conspicuously existing near the user is that having a high utilization degree such as contents information most recommended, contents information which is interesting to the user, or contents information having a high frequency of use, the user selects any contents information which catches her or his attention to thereby easily use or view the information.

FIG. 5 shows a concrete example of an interface screen produced according to the idea above. Although contents information is seen only in a front side of a center of the place where the user stands in this example, the contents information is also disposed in a rear side thereof.

Moreover, the example shown in FIG. 5 includes a plurality of contents display zones established for a contents genre regarding fashion (FA), a contents genre for travel (TR), a contents genre for movie (MO), and a contents genre for recommendation distributed in the morning and in the evening as time for usual activities (TI). Contents information items are arranged in the contents display zones respectively associated therewith.

These zones extend in a direction of depth and are disposed such that the user receives an impression that an item at an deeper position is more apart from the user.

The contents information items displayed in this situation are FA1, TR1 to TR3, MO1 to MO5, and TI1 to TI4, which correspond to items ordinarily called icons.

Incidentally, in a rear side not shown in FIG. 5, there are arranged other contents information items. The user can call such items such that the items are seen in the screen by horizontally changing the field of vision with the help of rotary dial 405 of remote controller 400.

As described above, the items are arranged in the respective contents information display zones in which the items having a higher utilization degree such as contents information items highly recommended, contents information items which are more interesting to the user, or contents information items having a higher frequency of use are arranged in the direction of depth beginning at the front side in a sequence in which sizes thereof become smaller as the depth thereof increases.

Additionally, the zone in the depth direction extends to an upper side of the screen. The screen is accordingly established such that the contents information items become smaller in size as the positions thereof become higher in the screen.

Incidentally, the contents display zones allocated in the peripheral of the central point where the user stands can be arbitrarily classified.

It can be considered, for example, a set of recommendation contents according to genres used in various information magazines, a set of recommendation contents according to each style according to life styles, and a set of recommendation contents regarding keywords (e.g., a talent name, a program name, etc.) which will be interesting to users as a category. However, the present invention is not restricted by this example.

To achieve a more real representation in accordance with the interface screen associated with the recognition model of the present invention, there may be used, in addition to the representation in which contents information at a farther position is displayed with a reduced size, a representation using a perspective representation in which lightness, chroma saturation, and hue of contents information are changed and/or contents information can be obscured.

FIGS. 7 to 15 are flowcharts for explaining operation of the embodiment of a processing apparatus of the present invention and FIGS. 16 to 19 are diagrams showing screen examples sequentially displayed according to the operation.

Referring next to the screen examples shown in FIGS. 16 to 19, description will be given of flows shown in FIGS. 7 to 15. However, the flows in the following description relate to the processing apparatus shown in FIG. 2. In this regard, the processing of FIG. 1 and FIG. 3 is also similar to that above and hence will not be described.

(1). In the flow shown in FIG. 7, when processing apparatus 100 is powered, a user selection screen is displayed as shown in FIG. 16(a). (Steps 1001 and 1002)

(2). The user who has powered apparatus 100 moves horizontally and vertically cursor switch 406 of apparatus 400 to move the cursor to a user name displayed to thereby select the user name of the user and then depresses cursor switch 406 to input the determined input item.

The operation of the remote controller is indicated by "W" enclosed by a circle. In the description below, this operation will be described as operation W. (step 1003)

(3). When the user name is selected and is inputted, a selected user mode is set to the processing apparatus. (Step 1005)

(4) When the user name input is not conducted for a predetermined period of time (e.g., about five seconds), a family mode is automatically selected and is set if the processing apparatus is commonly used by family members.

Moreover, if the processing apparatus is commonly used by other than the family members, there is set a common mode beforehand determined for such users, for example, a channel mode of the last program viewed or a channel mode recommended by the system. (Step 1004)

(5). In a mode set in step 1004 or 1005, a program on the air is displayed according to a selected user profile as shown in FIG. 16(b). (step 1006)

(6). To select, in a state in which a screen like that shown in FIG. 16(b) is being displayed, another program or information, the user depresses menu switch 403 of remote controller 400.

As a result, a menu is displayed in an upper region of the screen as if the user has moved her or his eyes upwards as shown in FIG. 16(c). (Steps 1007 and 1008)

(7). The menu displayed in step 1008 is, for example, "recommendation", "select from other media", "search using keyword", "mail corner", or "mini-information of weather forecast and news". The user conducts operation W of the cursor switch to select one of the menu items.

In response thereto, a screen corresponding to the menu is displayed. Assume in this operation that "recommendation" has been selected. (Step 1009)

Figure 16:
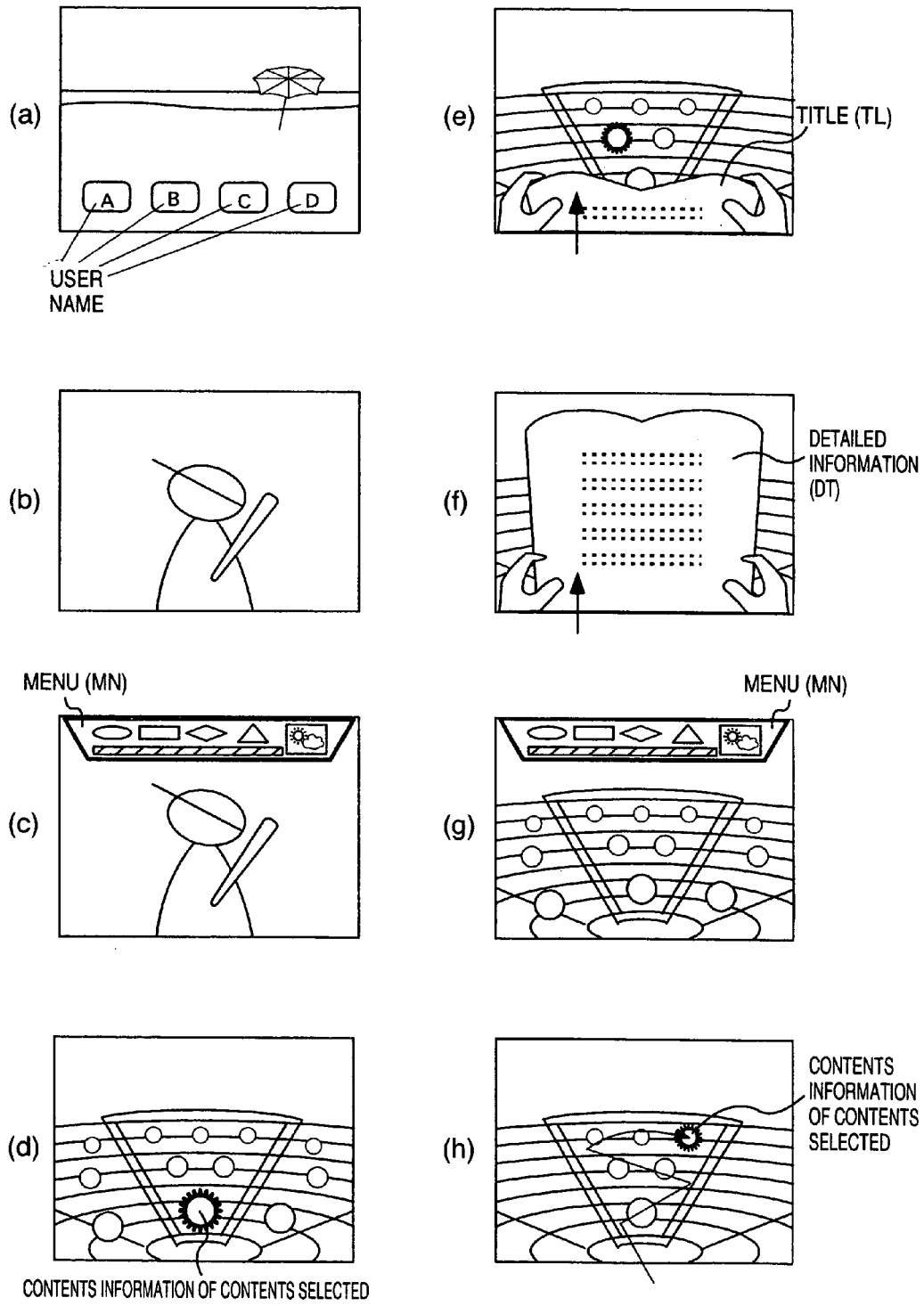
FIG. 16 is a diagram showing screen examples sequentially displayed according to the operation.

(8). Processing goes to the flow of FIG. 8. First, a group of contents information items (icons) indicated recommended contents as shown in FIG. 16(*d*) are displayed such that those having a higher degree of recommendation are placed on a front side. A contents display zone to which contents information selected at this point is displayed at a position near a center of the screen in the longitudinal direction thereof. (Step 1100).

(9). When the user depresses detail switch 407 of remote controller 400 to know details of the recommended contents, a title (TL) of contents having a highest degree of recommendation is displayed in a lower region of the screen as if the user has raised the book to read the contents thereof as shown in FIG. 16(*e*). (Steps 1101 and 1106)

(10). To know further detailed information of the contents, the user depresses again detail switch 407. Then, detailed information (DT) of the contents are displayed, for example, if the recommendation is a drama, a film, or the like, there are displayed names of performers, an outline of story, and the like.

Furthermore, although not shown in the screen example, an operation panel of the program is displayed and then an operation menu is displayed.

The operation menu includes, for example, "playback", "stop", "rewind", "fast forward", "save", and "delete". An item thereof is selected by operation W of the cursor switch.

In this connection, the operation to select a menu item is as described in relation to operation W. (Steps 1108 and 1109)

(11). When the user depresses again detail switch 407 in the state of step 1109, processing returns to step 1100 to conduct another operation. (step 1110)

(12). In the state in which the screen of FIG. 16(*e*) is being displayed, when the user depresses cursor switch 406 as a determination key of the remote controller in step 1106, a program operation panel is displayed to, for example, view the program, which will be described later. (Step 1107)

(13). In the state of display in step 1100, when the user depresses cursor switch 406 as a determination key of the remote controller in step 1106, the user can view, as selectable contents, contents having a highest degree of recommendation. The operation in this situation will be described later. (Step 1102)

(14). In the state of display in step 1100, when menu key 403 is depressed, a menu is displayed in an upper region of the recommendation screen as shown in FIG. 16(*g*), and processing can return to operation which begins at step 1008 described above. (Steps 1103 and 1111)

(15). To select contents information by the cursor in the display state in step 1100, the user operates cursor switch 406 to move the cursor in the screen to indicate content information (icons) displayed in the screen as shown in FIG. 16(*h*).

In this situation, the cursor can be moved only in an area in which the recommended contents are displayed. (Step 1104)

(16). To view contents indicated by the cursor according to the operation in step 1104, the user depresses the determination key to view the program. The operation in this situation will be described later. (Steps 1112 and 1120).

Figure 17:
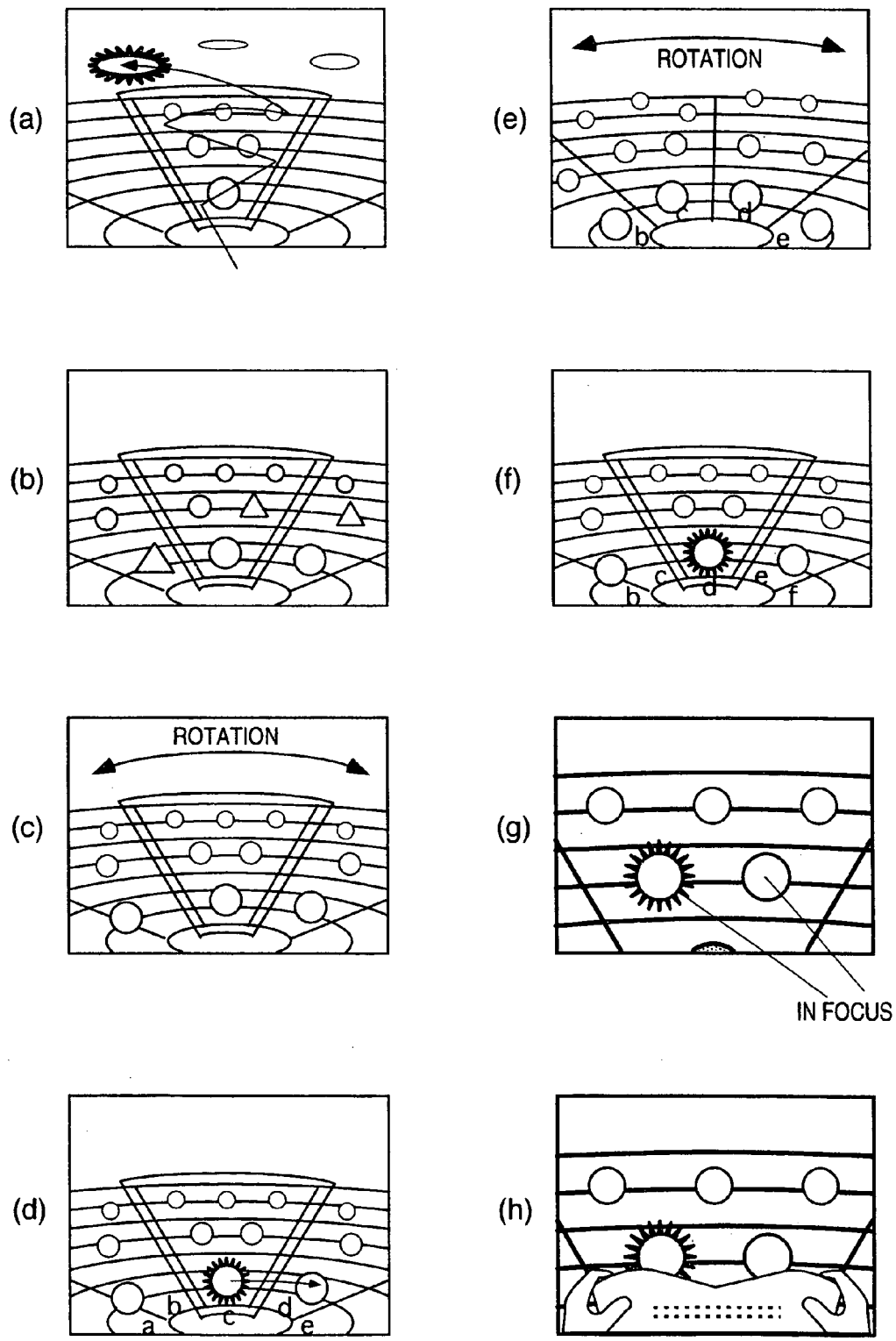
FIG. 17 is a diagram showing screen examples sequentially displayed according to the operation.
Figure 18:
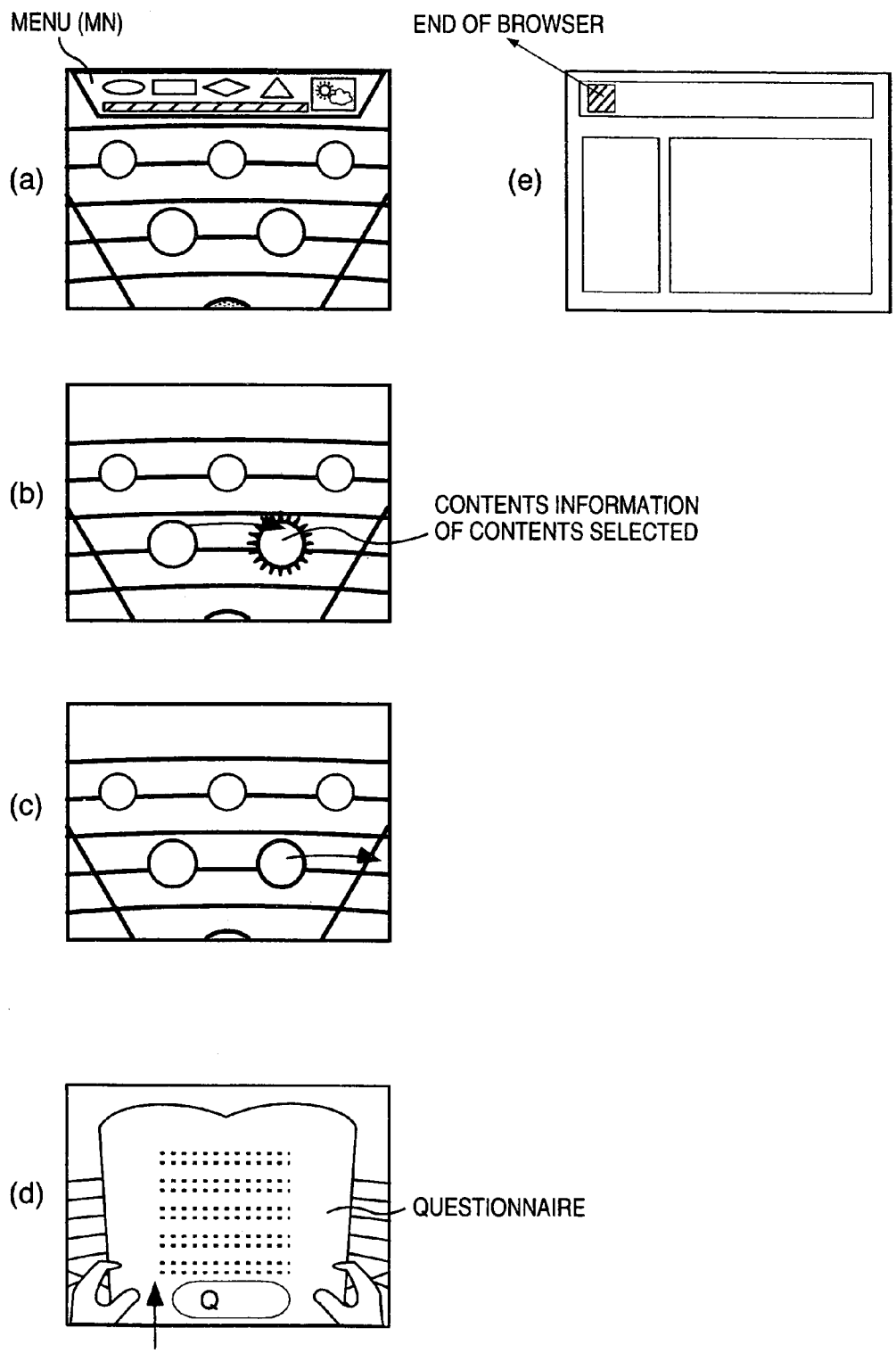
FIG. 18 is a diagram showing screen examples sequentially displayed according to the operation.
Figure 19:
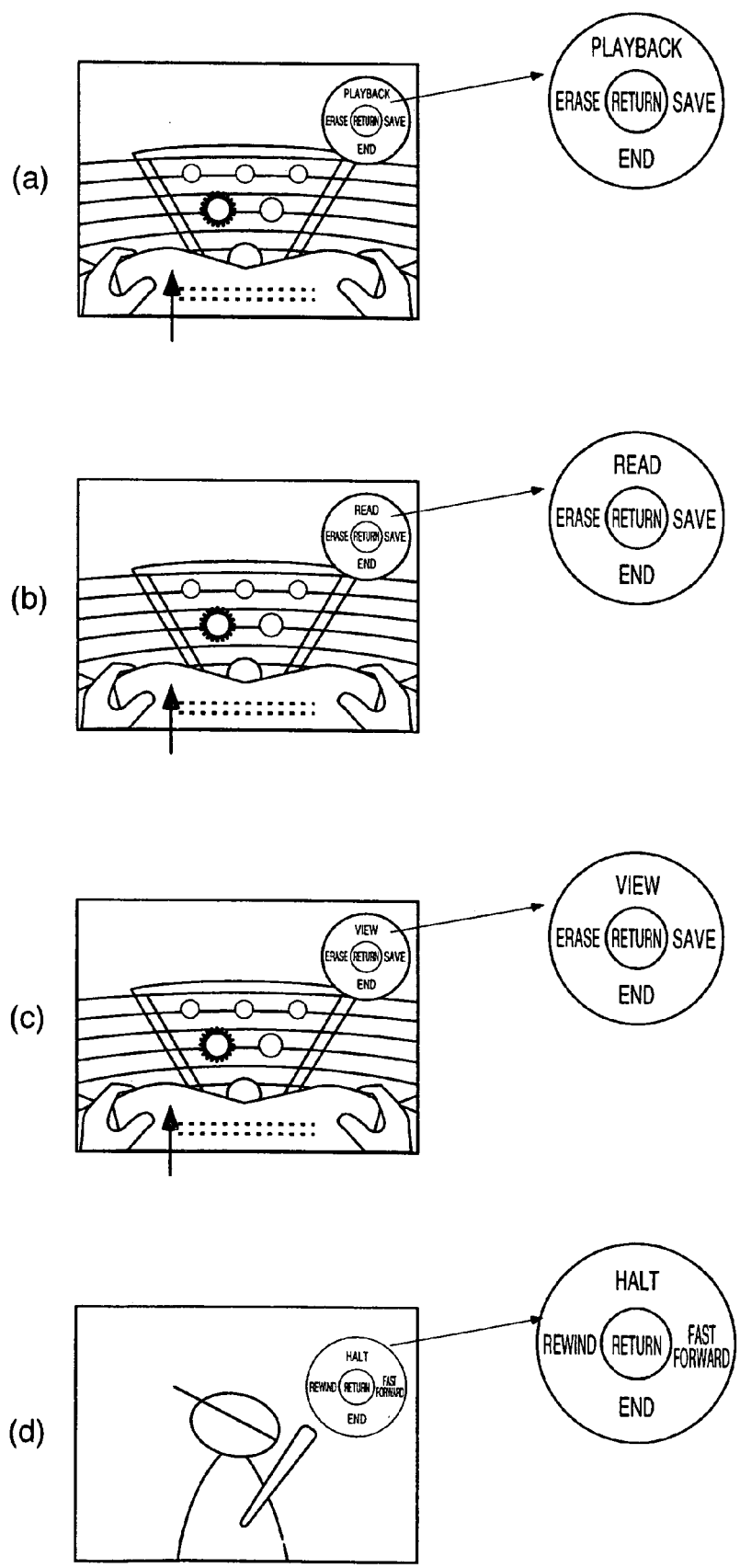
FIG. 19 is a diagram showing screen examples sequentially displayed according to the operation.

(17). To change contents to be selected, the use can further move the cursor upward (farther) such that the cursor is outside the circle in which contents information is arranged as shown in FIG. 17(*a*). (Steps 1113 and 1116)

(18). When the user conducts operation W of the cursor switch in the state in which the cursor is outside the circle in which contents are arranged in step 1116, another user mode is selected and there is displayed a screen in which contents information is arranged according to a profile of another user as shown in FIG. 17(*b*). Thereafter, control returns to operation beginning at step 1005. (Steps 1117 and 1121)

(19). There may be used, as another method to change contents to be selected in step 1112, a method in which cursor switch 406 is depressed for the rightward or <leftward movement to move the cursor to an adjacent area.

When the cursor moves to an adjacent area as shown in FIG. 17(*d*), the circles in which contents information is arranged turn as shown in FIG. 17(*e*) such that the adjacent area is displayed at the center as shown in FIG. 17(*f*).

Resultantly, there is shown, in the screen, contents information of another genre in the area adjacent to the area in which the recommended contents information is arranged. Operation beginning at step 1100 can be conducted in this screen. (Steps. 1115, 1118, 1119, and 1123)

(20). When it is desired, as another method to change contents information to be selected in step 1112, to select contents information from a genre or the like other than the recommendation displayed in the central position of the screen in the display state in step 1100, the user rotates rotary dial 405 of remote controller 400 as shown in FIG. 17(*c*).

As a result, the display screen turns as rotary dial 405 rotates to change the selection area such that a group of contents information items of a desired genre are displayed in the central region to be selected by the user. (Steps 1105 and 1124)

(21). In the state of display screen of step 1124, the user can conduct operation beginning at step 1100, and if the user depresses the determination key, the user can view contents information having a highest degree of recommendation among the contents information which can be selected. (Steps 1125 and 1126).

(22). There is, as further another method to change the contents to be selected in step 1112, a method to depress zoom-in/zoom-out switch 404 of remote controller 400.

When the user depresses the determination key without depressing switch 404, it is possible to view a program indicated by the cursor at this point of time. (Steps 1114 and 1122).

(23). Moving to FIG. 9, assume that zoom-in switch is depressed. Then, the screen is magnified to be displayed with the magnification center set to the contents with which the cursor is brought into contact and which is then focused as shown in FIG. 17(*g*).

By depressing the determination key in this state, the user can view a program of the contents information indicated by the cursor. (Steps 1201 to 1203)

(24). When the zoom-out key is depressed in the state in which the image shown in FIG. 17(*g*) is shown in step 1202, control returns to the original state in which the user can conduct operation beginning at step 1100 of FIG. 8 (steps 1204 and 1205).

(25). When the detail switch is depressed in the state in which the image of FIG. 17(g) in step 1202 is displayed, a title and the like of the contents information indicated by the cursor at this point of time are displayed, and the user can conduct operation beginning at step 1106 or 1108 of FIG. 8. (Steps 1206 and 1207)

(26). When menu switch 403 is depressed in the state in which the image of FIG. 17(g) in step 1202 is displayed, a menu is displayed in an upper region of the screen currently being displayed as shown in FIG. 18(a), and the user can return to operation beginning at step 1008 described above. (Steps 1208 and 1209)

(27). In the state in which the image of FIG. 17(g) in step 1202 is displayed, the user can select contents using the cursor key as shown in FIG. 18(b).

When operation W is conducted, namely, the contents are changed and are selected and the determination key is depressed, the user can view a program of the contents indicated by the cursor. (Steps 1210 to 1212)

(28). In the operation to change the contents by the cursor in step 1211, when the cursor switch is further depressed for the rightward or leftward movement, the cursor moves to an adjacent area as shown in FIG. 18(c), and at the same time, the image is returned to a zoom-out state centered on the pertinent area. The user can then conduct operation beginning at step 1100 of FIG. 8. (Steps 1213 to 1215)

Figure 10:
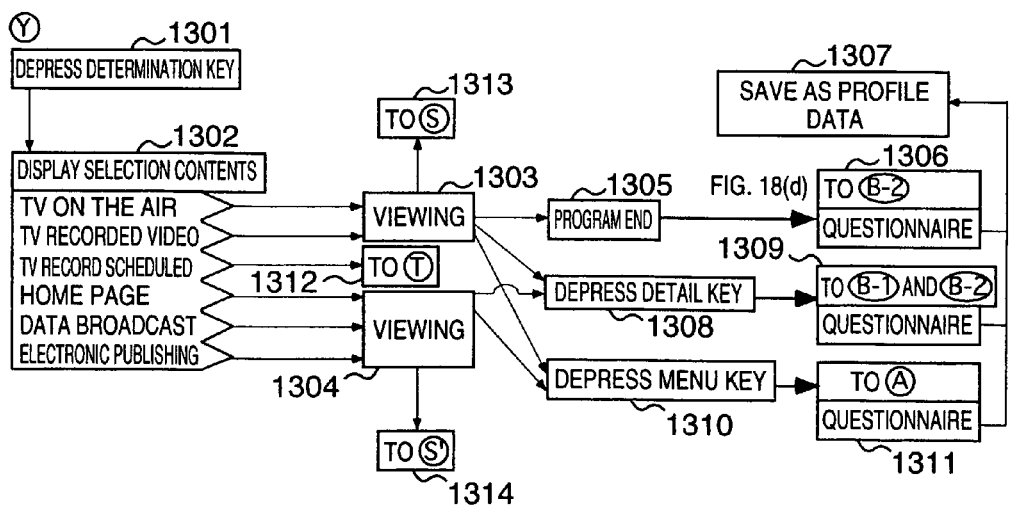
FIG. 10 is a flowchart for explaining operation to select information for the viewing thereof and operation of the processing apparatus in the embodiment in accordance with the present invention.
Figure 11:
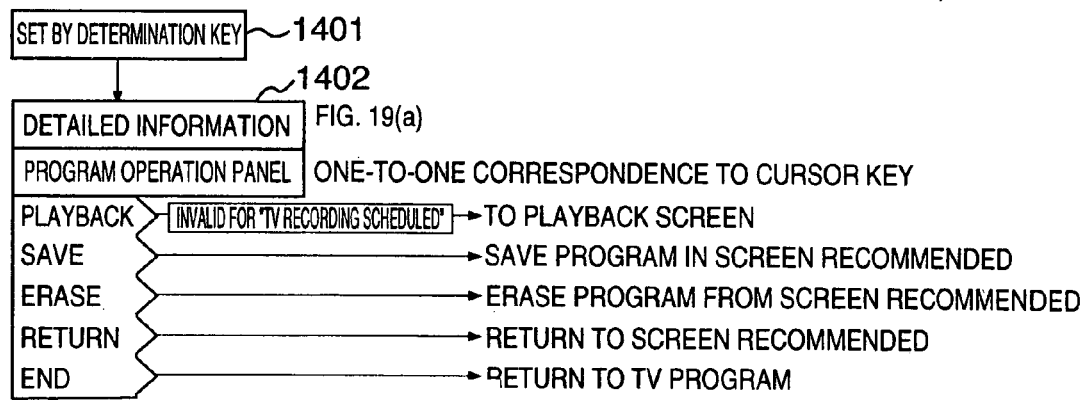
FIG. 11 is a flowchart for explaining operation to select information for the viewing thereof and operation of the processing apparatus in the embodiment in accordance with the present invention.

Next, referring to the flow of FIG. 10, description will further given of operation when the depression key is depressed in step 1102, 1120, 1122, 1126, or 1203 described above.

Incidentally, although described, to depress the determination key means to depress 4-direction cursor switch 406 downward, not in the vertical and horizontal directions.

(29). When the determination key is depressed, the constituent items of the selected contents are displayed. When the contents include "TV on the air", "TV recorded", "home page", "data broadcast", or "electronic publication", the user can immediately utilize the contents only by depressing the depression key. (Steps 1301 to 1304)

(30). When "viewing" of the contents in step 1303 is a TV program on the air, a questionnaire for the contents is displayed as shown in FIG. 18(d) when the program is entirely viewed.

The questionnaire is in a simple form in which one of a plurality of answers is to be selected, and the user can answer the questionnaire by selecting items by the cursor switch.

When the user answers the questionnaire, information thereof is saved as profile data. Thereafter, the user can conduct operation beginning at step 1108. (Steps 1305 to 1307)

(31). At an intermediate point of the viewing of the contents in step 1303 or 1304, when the user stops the viewing and depresses detail switch 407, a questionnaire for the contents is displayed as above.

When the user answers the questionnaire, information thereof is saved as profile data. Thereafter, the user can conduct operation beginning at step 1106 or 1108. (Steps 1308, 1309, and 1307)

(32). At an intermediate point of the viewing of the contents in step 1303 or 1304, when the user stops the viewing and depresses menu switch 403, a questionnaire for the contents is displayed as above.

When the user answers the questionnaire, information thereof is saved as profile data. Thereafter, the user can conduct operation beginning at step 1108. (Steps 1310, 1311, and 1307)

(33). At an intermediate point of the viewing of the contents in step 1303, when the user again depresses the determination key, control moves to the flow shown in FIG. 14.

Figure 12:
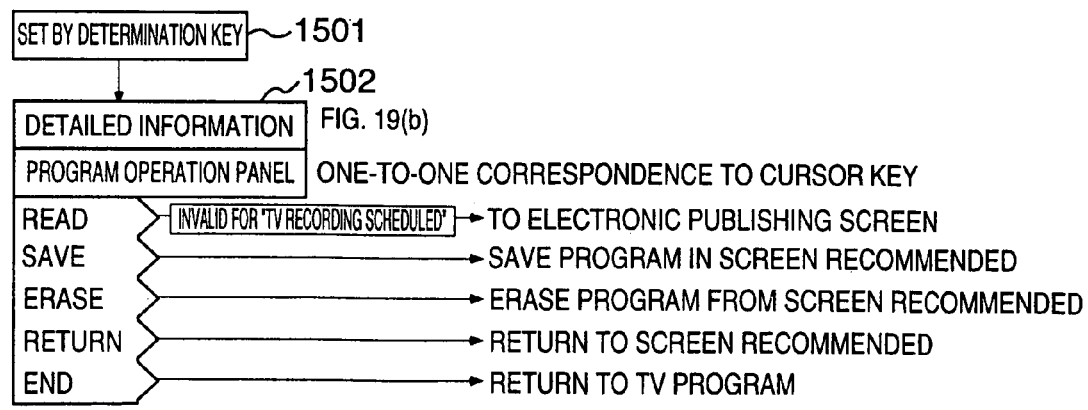
FIG. 12 is a flowchart for explaining operation to select information for the viewing thereof and operation of the processing apparatus in the embodiment in accordance with the present invention.
Figure 13:
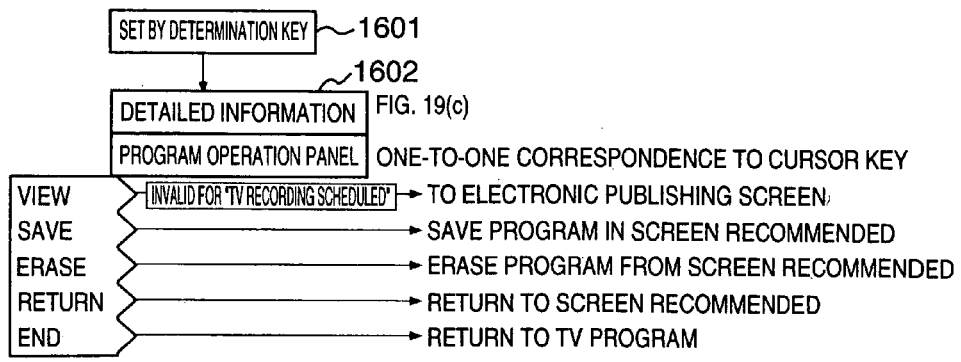
FIG. 13 is a flowchart for explaining operation to select information for the viewing thereof and operation of the processing apparatus in the embodiment in accordance with the present invention.
Figure 14:
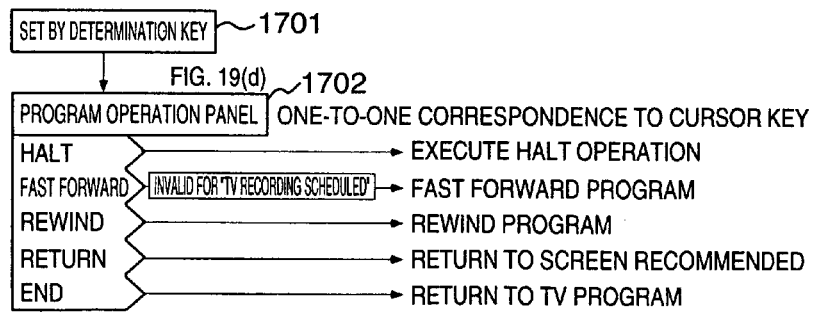
FIG. 14 is a flowchart for explaining operation to select information for the viewing thereof and operation of the processing apparatus in the embodiment in accordance with the present invention.
Figure 15:
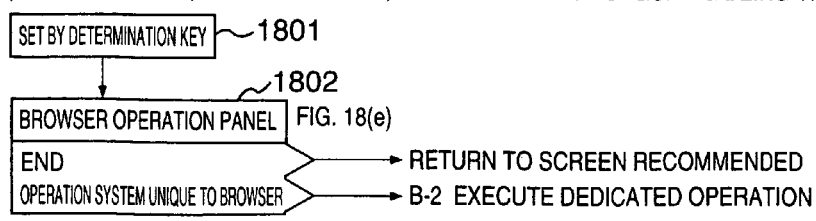
FIG. 15 is a flowchart for explaining operation to select information for the viewing thereof and operation of the processing apparatus in the embodiment in accordance with the present invention.

Additionally, when the user again depresses the determination key at an intermediate point of the viewing of the contents in step 1304, control moves to the flow shown in FIG. 12 if the contents are "electronic publishing". Control moves to the flow shown in FIG. 13 if the contents are "home page" (steps 1313 and 1314).

(34). Moreover, when the contents in step 1302 are "TV recording scheduled (including a situation in which a program is on the air and is to be viewed in a concurrent manner)" or "TV recorded", control moves to the flow shown in FIG. 11. (Step 1312)

(35). Moving to the flow shown in FIG. 11, when the determination key is again depressed in step 1302, detailed information of the contents and the program operation panels corresponding to cursor switch 406 are displayed as shown in FIG. 19(a).

The user can, for example, "reproduce", "save", or "erase" the program by operating cursor switch 406 according to the program operation panel displayed.

In addition, the user can return to the recommendation screen and the TV screen by "return" and "end". (Steps 1401 and 1402)

(36). Moving to the flow of FIG. 12, when the user again depresses the determination key at an intermediate point of the viewing of the contents in step 1304 above and the contents are "electronic publishing", detailed information of the contents and the program operation panel corresponding to cursor switch 406 are displayed as shown in FIG. 19(b).

The user can, for example, "read", "erase" or "save" the publishing by operating cursor switch 406 according to the program operation panel displayed.

In addition, the user can return to the recommendation screen and the TV screen by "return" and "end". (Steps 1501 and 1502)

(37). Moving to the flow of FIG. 13, when the user again depresses the determination key at an intermediate point of the viewing of the contents in step 1304 above and the contents are "home page", detailed information of the contents and the program operation panel corresponding to cursor switch 406 are displayed as shown in FIG. 19(c).

The user can, for example, "view", "erase" or "save" the home page by operating cursor switch 406 according to the program operation panel displayed. Moreover, the user can return to the recommendation screen and the TV screen by "return" and "end". (Steps 1601 and 1602)

(38). Moving to the flow of FIG. 14, when the user again depresses the determination key at an intermediate point of the viewing of the contents of a TV on the air or recorded contents in step 1304 above, the program operation panel corresponding to cursor switch 406 are displayed in the display screen as shown in FIG. 19(d).

The user can, for example, halt or fast rewind the program by operating cursor switch 406 according to the program operation panel displayed.

In addition, the user can return to the recommendation screen and the TV screen by "return" and "end". (Steps 1701 and 1702)

(39). If the determination key is depressed when the user is reading the electronic publishing or the home page described by referring to FIG. 13, control moves to the flow shown in FIG. 15 and a browser operation panel is displayed as shown in FIG. 18(e).

When the user indicates "end" in the operation panel, control returns to the recommendation screen. The user can conduct operation dedicated to the browser only by achieving operation according to another indication for operation in the panel (steps 1810 and 1802).

Figure 22:
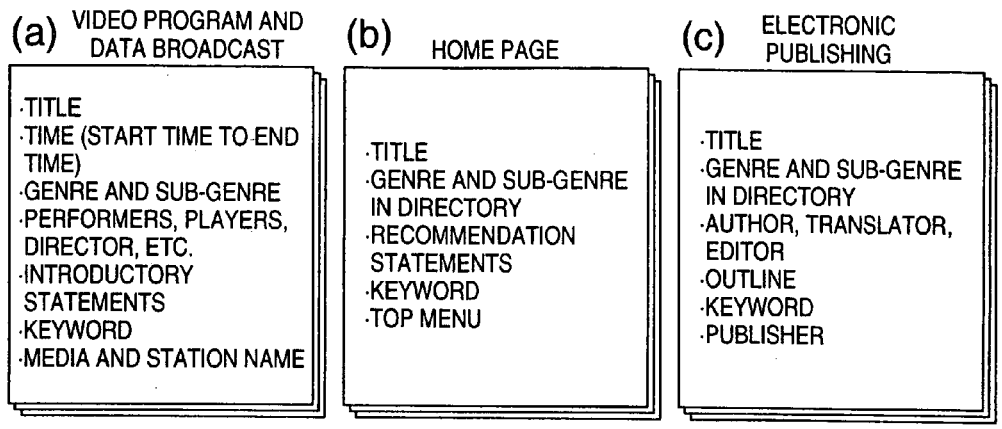
FIG. 22 is a diagram for explaining contents guide data.

FIG. 20 is a diagram for explaining a method of setting taste of the user to a profile data in an initial state, FIG. 21 is a diagram for explaining a concrete example of a profile data created through the flow shown in FIG. 10, and FIG. 22 is a diagram for explaining contents guide data. Description will now be given of profile data.

As can be seen from FIG. 20, when the user instructs an initial registration of profile data through a device, not shown, many genre names and numeric lines to assign points thereto are displayed on the screen.

For each numeric line, a left end and a right end are defined as "to view (100 points)" and "not to view (0 point)", respectively. The user who desires to conduct the initialization selects one genre by the cursor, moves the cursor on the line to a position indicating a degree to desire the viewing, and depresses the determination key. The user conducts the operation for all genres and finally depresses again the determination key. As a result, there is produced a profile to which the initial data of the user is set.

The profile created for each user as above is updated when the user views contents such as a TV program or the like using the processing apparatus.

The profile data for each user includes, as shown in FIG. 21, a user genre profile table in which genres are arranged in the descending point order for each genre and for each time zone, a user keyword profile table in which the points for keywords are arranged in the descending point order for each genre, and the like.

Contents guide data shown in FIG. 22 is generated for a plurality of contents respectively belonging to "video program-data broadcast", "home page", and "electronic publishing" as shown in FIGS. 22(a) to 22(c). The contents of the data may be same as those displayed when the detail switch is depressed in the flow described above.

The data is also referred to when the points of respective contents are changed in the profile.

In other words, when the user views or saves contents, contents guide data of the contents is referred to such that if the profile data of the user includes the same genre description and the same keyword as those of the contents, points are added to those of the genre and the keyword of the profile data according to the viewing time.

The profile data generated as above is referred to, in a screen example to select contents in the operation flow described above, to display the screen. Contents information having a highest value of points is arranged and displayed at the nearest side at the point of time in the display.

Moreover, to generate the recommendation screen in the description of the flow above, it is possible to collect, for example, six highest values of points for "genre", "keyword", and "time zone" of the profile data of each user described above.

Figure 23:
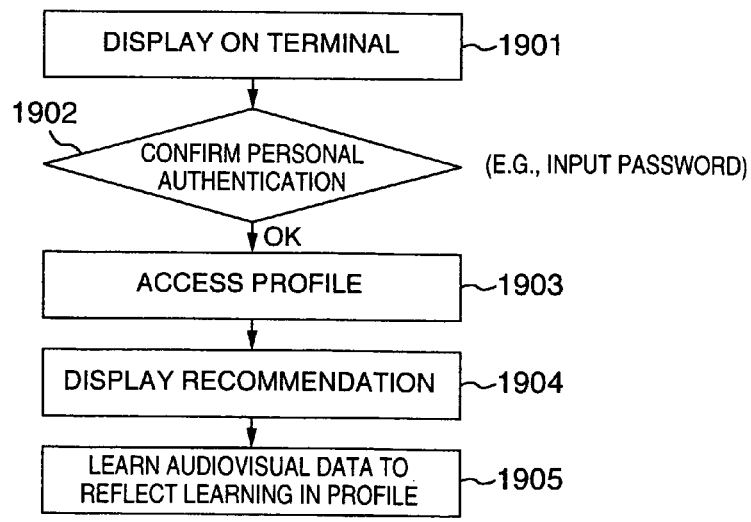

FIG. 23 is a flowchart to explain processing to access a profile when processing apparatus 700 of FIG. 3 is a personal computer installed in an office or the like. Description will be next given of the flowchart.

When apparatus 700 of FIG. 3 is a personal computer installed in an office or the like, the personal computer can also be used by other persons in general. Therefore, it is necessary that a profile which belongs to a particular person is prevented from being accessed by other persons.

The flow of FIG. 23 is prepared for such a situation so that a profile can be accessed after authentication of a person is processed.

(1). When a password or the like is inputted for authentication of a person after the personal computer starts its operation, service provider 600 connected to the personal computer makes a check to determine whether or not the password is correct. If correct, provider 600 allows the user to access the profile. (Steps 1901 and 1902)

(2). Thereafter, the user can view recommended information or other desired information according to data from user profile 601 of her or his own in provider 600. After the viewing, the data viewed is learned and the learning is reflected in the user profile. (Steps 1903 to 1905)

In accordance with the embodiment of the present invention described above, a plurality of contents information items are arranged in a three-dimensional fashion and contents information of different kinds are horizontally displayed such that items having a higher utilization degree of the user are displayed at a nearer side in a direction of depth. Consequently, the user can easily select information in a feeling as if the user is on a plane and selects items surrounding the user.

Furthermore, in accordance with the embodiment of the present invention described above, there are created, according to utilization history of the user for information of a plurality of media in the past, a plurality of kinds of profiles assigned with variables indicating utilization degrees of the information, and contents information is displayed according to at least one of the profiles generated. Therefore, it is possible for the user to immediately select her or his favorite contents information.

Subsequently, description will be given of an embodiment in which the basic concept of the present invention shown in FIGS. 5 and 6 is applied to a car information system called a car navigation system or an intelligent transport system.

Figure 24:
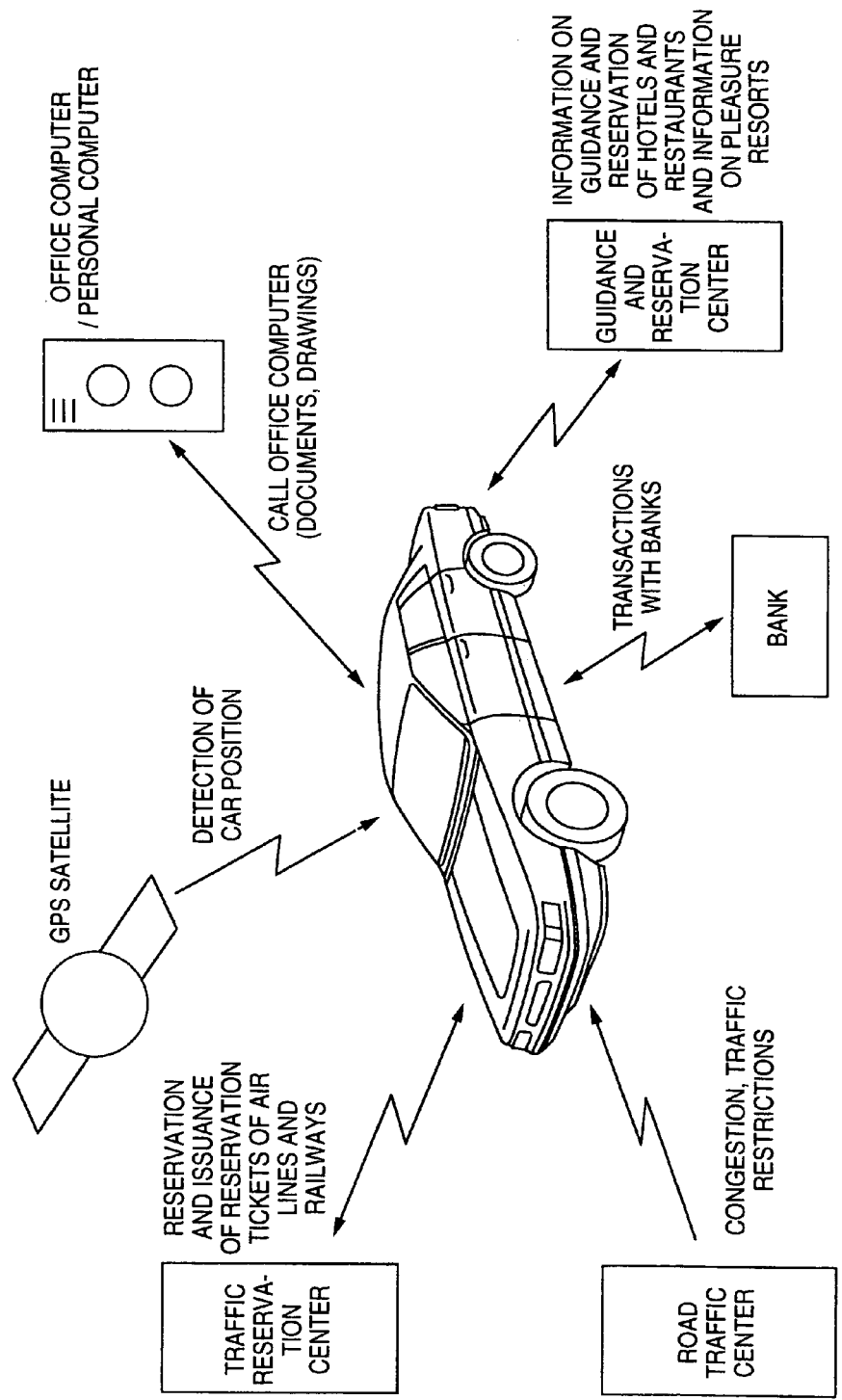
FIG. 24 is a diagram showing a system configuration of a car information system.

FIG. 24 shows in a configuration diagram a car information system in which a car can acquire various information.

It can be considered that the various information includes information regarding a car position from a global positioning system (GPS) satellite, information regarding reservation and issuing of reservation tickets of air lines and railways, information regarding congestion and traffic restrictions from a road traffic center, information regarding transactions with banks, information regarding guide and reservation of hotels and restaurants or leisure from a tourist guidance and reservation center, and information regarding calls and processing of jobs of office computers and personal computers.

In this situation, the information above is acquired via an antenna, a portable telephone, or a portable terminal having a function of a telephone which are mounted on the car.

Moreover, information of one-way communication such as information regarding a car position from a GPS satellite or information regarding congestion and traffic restrictions from a road traffic center is received via an antenna.

On the other hand, information of two-way communication such as information regarding reservation and issuing of reservation tickets of air lines and railways, information regarding transactions with banks, information regarding guide and reservation of hotels and restaurants or leisure from a tourist guidance and reservation center, or information regarding calls and processing of jobs of office computers and personal computers is received and transmitted via a portable telephone or a portable terminal having a telephone function.

Such a car information system employs a processing apparatus similar to that shown in FIG. 2 to process information.

That is, information of one-way communication such as information regarding a car position from a GPS satellite or information regarding congestion and traffic restrictions from a road traffic center is received via antenna 200.

Moreover, by replacing telephone line with a portable telephone or a portable terminal having a telephone function, information of two-way communication such as information regarding reservation and issuing of reservation tickets of air lines and railways, information regarding transactions with banks, information regarding guide and reservation of hotels and restaurants or leisure from a tourist guidance and reservation center, or information regarding calls and processing of jobs of office computers and personal computers is received and transmitted.

When the reservation and issuance of reservation tickets are achieved and/or transfer of money takes place for banking transactions or the like, an electronic commerce system 80 using an integrated circuit (IC) card 90 is installed in processing apparatus 100. System 80 receives information from command receiver 113 and user profile 105.

Therefore, when electronic commerce system 80 is initiated, system 80 displays detailed information on display 300 and carries out commercial transactions according to commands from command receiver 113.

Figure 25:
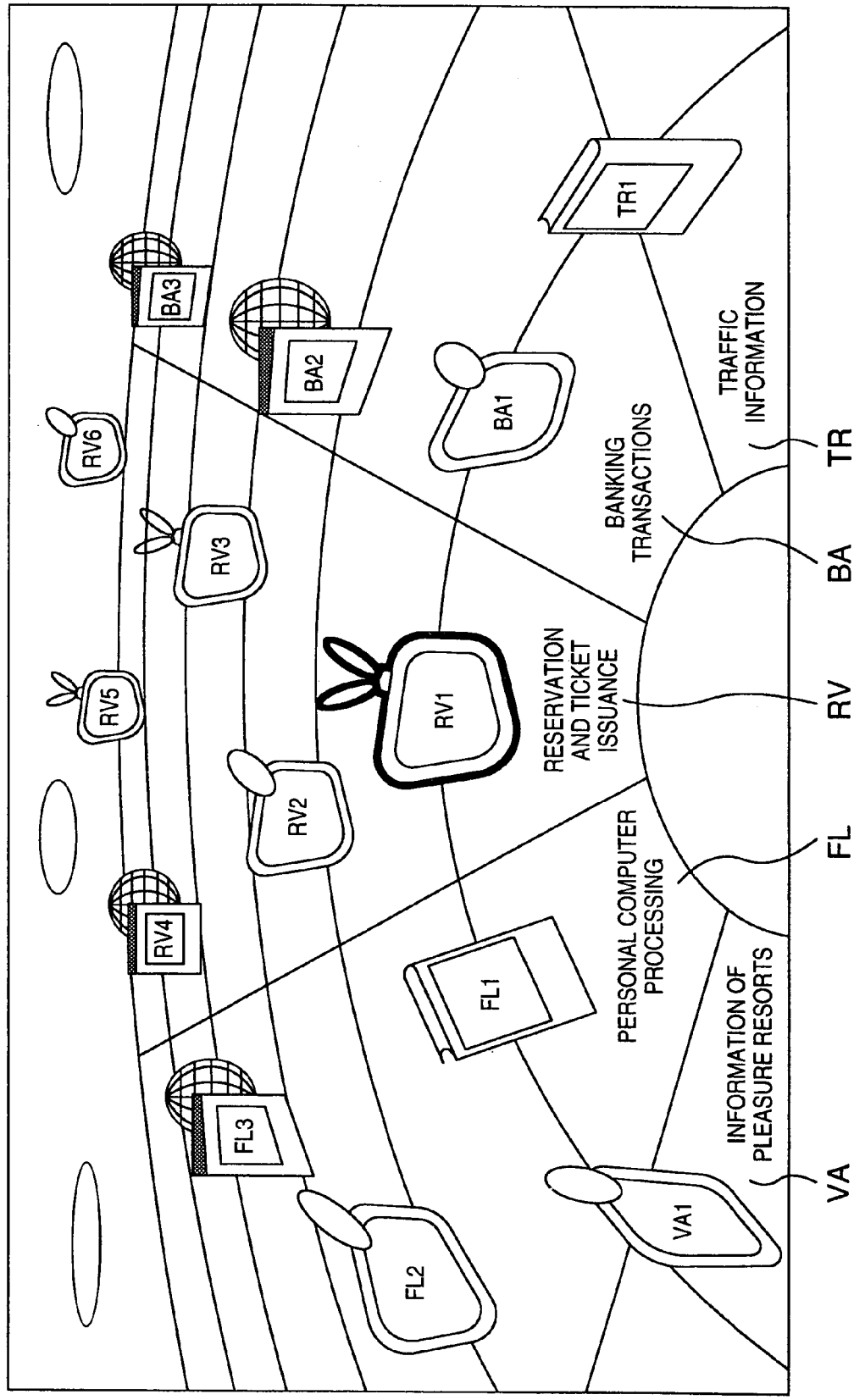
FIG. 25 is a diagram for explaining an example of a guide (interface) screen to select information using a display employed in a car information system.

FIG. 25 shows a concrete example of an interface screen of such a car information system. Although there can be seen only contents information on the front side of the center where the user stands in this example, contents information is also arranged on the rear side thereof.

In the example of FIG. 25, a plurality of contents display zones are established such as a contents genre regarding leisure (VA), a contents genre regarding information processing such as retrieval and editing of documents, drawings, etc. by a personal computer or the like (FL), a contents genre regarding the reservation and issuance of reservation tickets (RV), and a contents genre regarding banking transactions (BA) which are associated with two-way communication and a contents genre regarding traffic information which is associated with one-way communication. Contents information items are arranged in the contents display zones respectively associated therewith.

The contents display zones are classified according to respective genres as shown in FIG. 5. The zones of FIG. 25 include at least two genres, i.e., contents associated with one-way communication and contents associated with two-way communication. Furthermore, the contents associated with two-way communication are classified into four genres.

The contents information items in this situation are represented as VFA1, FL1 to FL3, RV1 to RV6, BA1 to BA3, and TRA.

Incidentally, on the rear side not visible in this diagram, other contents information items are arranged in the similar manner as for FIG. 5. By operating rotary dial 405 of remote controller 400, the field of vision can be horizontally changed to call such items to be displayed in the screen.

As already described, in each contents display zone, items having a higher utilization degree, namely, a higher degree of recommendation, a higher degree of interest of the user, or a higher frequency of use are arranged in an order in which sizes thereof are sequentially minimized toward a deeper place in a direction of depth.

In accordance with the car information system above, a plurality of contents information items are arranged in a three-dimensional fashion and contents information of different kinds are horizontally displayed such that items having a higher utilization degree of the user are displayed at a nearer side in a direction of depth. Consequently, the user can easily select information in a feeling as if the user is on a plane and selects items surrounding the user.

As described above, in accordance with the present invention, there can be provided a method of displaying, a method of processing, an apparatus for processing, and a system for processing multimedia information with high usability in which the user can easily select information desired by the user from a large amount of various contents, information is selected in place of the user according to taste of the user and is recorded and is saved, and/or the selectively recorded and saved contents can be optimally displayed for the user.

The invention claimed is:

1. A multimedia information display method for displaying a virtual three-dimensional space including a first zone plane, a second zone around said first zone plane, and a third zone, said third zone being placed above an approximately center user part, comprising the steps of:
    setting a user mode in response to a mode selection input by a user;
    reading data corresponding to a user, wherein the data is selected from data in a user profile created based on an audiovisual history for said user;
    displaying multi-media information as necessary until a determination is made of audiovisual contents to be displayed in said virtual three-dimensional space;
    in response to conditions of said user mode selected, providing a plurality of contents display zones extending horizontally in said approximately center user part on said screen, and arranging respectively a plurality of contents information, each corresponding to said plurality of contents display zones and having a size determined based on a utilization degree of said user and minimized toward a deeper place in a direction of depth on said screen;
    arranging a display of said first zone plane so as to rotate contents information items of said plurality of contents information selected by a cursor manipulation from said plurality of contents display zones corresponding to said conditions of said user mode selected such that said contents information items of a desired genre are displayed in a horizontally central region of said approximately center user part of said screen;
    receiving another input via a cursor manipulation onto a peripheral part around said first zone plane in request of another user mode;
    reading another data corresponding to said another mode selection input from the user profile prepared in accordance with the audiovisual history for said user thereupon;
    displaying contents display zones and contents information on said first zone plane in response to said another user mode; and
    displaying a menu board, in response to a manipulation request, for selecting from a plurality of selection methods above said approximately center user part.

2. A multimedia information display method according to claim 1,
    wherein said contents information items have different contours from one another respectively corresponding to kinds of media.

3. A multimedia information display method according to claim 1,
  wherein said first zone plane is arranged in a circle around a position of the user near a center of the screen extending toward a deeper place in a direction of depth on said screen, and
  wherein, at a time of arranging to display said contents information items of said plurality of contents information in said plurality of contents display zones corresponding to said conditions of said user mode selected to rotate, said plurality of contents display zones in said virtual three-dimensional space displayed are rotated around the position near the center of the screen.

* * * * *